United States Patent
Mitsuyoshi et al.

(10) Patent No.: US 10,316,207 B2
(45) Date of Patent: Jun. 11, 2019

(54) WATER-BASED INK

(71) Applicant: KAO CORPORATION, Tokyo (JP)

(72) Inventors: Kaname Mitsuyoshi, Wakayama (JP); Hirotaka Takeno, Wakayama (JP); Takayuki Suzuki, Wakayama (JP); Takahiro Yoshikawa, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/539,370

(22) PCT Filed: Dec. 16, 2015

(86) PCT No.: PCT/JP2015/085262
§ 371 (c)(1),
(2) Date: Jun. 23, 2017

(87) PCT Pub. No.: WO2016/104294
PCT Pub. Date: Jun. 30, 2016

(65) Prior Publication Data
US 2017/0369725 A1  Dec. 28, 2017

(30) Foreign Application Priority Data
Dec. 26, 2014  (JP) .................. 2014-266627

(51) Int. Cl.
B41J 2/01     (2006.01)
C09D 11/38    (2014.01)
B41M 5/00     (2006.01)
C09D 11/324   (2014.01)

(52) U.S. Cl.
CPC ............ C09D 11/38 (2013.01); B41J 2/01 (2013.01); B41M 5/00 (2013.01); C09D 11/324 (2013.01)

(58) Field of Classification Search
None
See application file for complete search history.

(56) References Cited

U.S. PATENT DOCUMENTS

| | | |
|---|---|---|
| 2004/0157957 A1 | 8/2004 | Ganapathiappan et al. |
| 2005/0124728 A1 | 6/2005 | Komatsu et al. |
| 2009/0068417 A1* | 3/2009 | Saito .................... C09D 11/322 428/195.1 |
| 2011/0234682 A1 | 9/2011 | Ohta et al. |
| 2011/0267408 A1* | 11/2011 | Aoi ...................... B41J 2/17513 347/86 |
| 2012/0306977 A1 | 12/2012 | Komatsu |
| 2015/0175825 A1 | 6/2015 | Yamazaki et al. |

FOREIGN PATENT DOCUMENTS

| | | |
|---|---|---|
| EP | 1 586 612 A1 | 10/2005 |
| EP | 2 362 014 A2 | 8/2011 |
| EP | 2 368 948 A1 | 9/2011 |
| JP | 2005-097597 A | 4/2005 |
| JP | 2006-206688 A | 8/2006 |
| JP | 2006-282759 A | 10/2006 |
| JP | 2006-282810 A | 10/2006 |
| JP | 2006-524269 A | 10/2006 |
| JP | 2009-155568 A | 7/2009 |
| JP | 2010-138332 A | 6/2010 |
| JP | 2010-174141 A | 8/2010 |
| JP | 2011-195763 A | 10/2011 |
| JP | 2012-246460 A | 12/2012 |
| JP | 2012-251047 A | 12/2012 |
| JP | 2015-123737 A | 7/2015 |
| JP | 2015-124238 A | 7/2015 |

OTHER PUBLICATIONS

International Search Report (PCT/ISA/210) issued in PCT/JP2015/085262, dated Mar. 15, 2016.
European Patent Office Communication and extended search report issued in the corresponding European Patent Application No. 15872863.4 dated Apr. 24, 2018.
Air Products, "SURFYNOL® DF-110D Defoamer," Material Safety Data Sheet, Version 1.13, MSDS No. 300000004712, Apr. 23, 2008, pp. 1-6.
Byk, "AQUACER 515," Safety Data Sheet, Version 4.0 SBD_REG_EU, Sep. 10, 2014, pp. 1-7.
Byk, "AQUACER 539," Material Safety Data Sheet, Version 1, Dec. 26, 2013, pp. 1-10.
Byk, "BYK-349," Material Safety Data Sheet, Version 5, Feb. 4, 2011, pp. 1-9.
European Third Party Observation for European Application No. 15872863.4, dated Jan. 25, 2019.

* cited by examiner

*Primary Examiner* — Erica S Lin
(74) *Attorney, Agent, or Firm* — Birch, Stewart, Kolasch & Birch, LLP

(57) ABSTRACT

The present invention relates to a water-based ink that exhibits excellent ejection properties, and can be prevented from suffering from reduction in a dot size of the ink during a drying step thereof even when printed on a low-water absorbing recording medium, and is capable of obtaining printed characters or images having excellent uniformity, as well as an ink-jet printing method using the water-based ink. The water-based ink includes a pigment, a water-insoluble polymer, an acetylene glycol-based nonionic surfactant (A) having HLB of not less than 0 and not more than 5, a nonionic surfactant (B) having HLB of not less than 6 and not more than 20, a polyether-modified silicone (C) having a kinematic viscosity of not less than 30 $mm^2/s$ and not more than 190 $mm^2/s$ as measured at 25° C. and an organic solvent (D), in which a weighted mean value of a boiling point of the organic solvent (D) is not lower than 150° C. and not higher than 230° C.

19 Claims, No Drawings

WATER-BASED INK

FIELD OF THE INVENTION

The present invention relates to a water-based ink and an ink-jet printing method using the water-based ink.

BACKGROUND OF THE INVENTION

The water-based ink has been extensively used as an ink for flexo printing, gravure printing or ink-jet printing.

In ink-jet printing methods, droplets of ink are directly projected onto a recording medium from very fine nozzles and allowed to adhere to the recording medium to form characters or images thereon. The ink-jet printing methods have become rapidly spread because of various advantages such as easiness of full coloration, low cost, capability of using a plain paper as the recording medium, non-contact with printed characters or images, etc.

In recent years, in the ink-jet printing methods, in order to impart good weathering resistance and good water resistance to printed matters, an ink for ink-jet printing which contains a pigment as a colorant and fine resin particles as a binder has been extensively used.

Also, in order to attain good adaptability to a nozzle head and further obtain printed matters having a high quality, a surfactant or an organic solvent has been used in the water-based ink for ink-jet printing.

For example, JP 2006-524269A (Patent Literature 1) discloses an ink-jet printing ink containing latex fine particles having a specific bulk density and a specific dielectric constant, and an effective amount of a surfactant adsorbed onto the surface of the respective latex fine particles. In JP 2006-524269A, it is also described that the ink is excellent in dispersion stability and printability.

JP 2009-155568A (Patent Literature 2) discloses a process for producing a water dispersion for ink-jet printing in which a mixture containing a colorant, polymer particles, a non-ionic organic compound, a water-soluble surfactant and water is heat-treated at a temperature of not lower than 40° C. In JP 2009-155568A, it is also described that a water-based ink for ink-jet printing containing the water dispersion is excellent in ejection properties.

JP 2006-282759A (Patent Literature 3) discloses an ink composition including water-insoluble polymer particles that contain a pigment and are capable of dispersing the pigment in the ink composition, a surfactant and water, in which the surfactant contains acetylene glycol and an ethyleneoxide adduct of acetylene glycol at a specific weight ratio. In JP 2006-282759A, it is also described that the ink composition is excellent in color developability to a plain paper and glossiness to a glossy coated paper as well as election stability, etc.

JP 2011-195763A (Patent Literature 4) discloses an aqueous ink composition that includes at least a water-insoluble colorant, a glycol ether compound having an HLB value of 4.2 to 8.0, a 1,2-alkyl diol compound having 4 to 8 carbon atoms, resin particles, water and a silicone-based surfactant and/or an acetylene glycol-based surfactant. In JP 2011-195763A, it is also described that the ink composition is capable of forming images having excellent printing quality and rub fastness on a non-ink absorbing recording medium or a low-ink absorbing recording medium.

JP 2006-206688A (Patent Literature 5) discloses an ink composition for ink-jet printing including a pigment, a water-soluble organic solvent and a penetrant in which the ink composition includes a 1,2-alkanediol and an alkyl (having 3 or more carbon atoms) ether derivative of a glycol as the water-soluble organic solvent, as well as a specific polysiloxane-based surfactant and a specific acetylene glycol-based surfactant as the penetrant. In JP 2006-206688A, it is also described that with the ink composition, it is possible to suppress occurrence of rainbow-like image unevenness (iridescent mottling) on printed images.

JP 2006-282810A (Patent Literature 6) discloses an ink composition including a solid solution pigment constituted of two or more kinds of quinacridone-based compounds, a polyether-modified polydimethylsiloxane compound and water. In JP 2006-282810A, it is also described that the ink composition is capable of realizing formation of highly color-developed images and is excellent in ejection stability, etc.

JP 2015-124238A (Patent Literature 7) discloses an ink composition for ink-jet printing including three or more kinds of acetylene glycol-based surfactants, a coloring material and water in which a total content of the acetylene glycol-based surfactants is from 0.1 to 3% by mass on the basis of a whole mass of the ink composition. In JP 2015-124238A, it is also described that the ink composition is capable of forming printed images having excellent image quality and fusing properties at a high printing speed.

On the other hand, it has been required to form printed characters or images not only on a high-water absorbing recording medium such as the aforementioned conventional plain paper and so-called copy paper, but also on a low-water absorbing coated paper such as an offset-coated paper or a recording medium for commercial printing purposes which is surface-treated with a non-water absorbing synthetic resin film such as a polyvinyl chloride resin film, a polypropylene resin film and a polyester resin film.

SUMMARY OF THE INVENTION

The present invention relates to a water-based ink that includes a pigment, a water-insoluble polymer, an acetylene glycol-based nonionic surfactant (A) having HLB of not less than 0 and not more than 5, a nonionic surfactant (B) having HLB of not less than 6 and not more than 20, a polyether-modified silicone (C) having a kinematic viscosity of not less than 30 mm$^2$/s and not more than 190 mm$^2$/s as measured at 25° C. and an organic solvent (D) having a specific boiling point.

DETAILED DESCRIPTION OF THE INVENTION

The water-based inks described in the aforementioned Patent Literatures 1 to 7 tend to sometimes suffer from reduction in a dot size of the inks during a drying step thereof when printed on a recording medium, in particular, when printed on a non-ink absorbing recording medium or a low-ink absorbing recording medium, and therefore fail to attain fully satisfactory uniformity of printed characters or images after drying.

The present invention relates to a water-based ink that exhibits excellent ejection properties, and can be prevented from suffering from reduction in a dot size of the ink during a drying step thereof and is capable of obtaining printed characters or images having excellent uniformity, even when printed on a low-water absorbing recording medium, as well as an ink-jet printing method using the water-based ink.

The present inventors have found that the aforementioned conventional problems can be solved by a water-based ink including a pigment, a water-insoluble polymer, two kinds of nonionic surfactants (A) and (B) which are different in HLB from each other, a polyether-modified silicone (C) having a specific kinematic viscosity and an organic solvent (D) having a specific boiling point.

That is, the present invention relates to the following aspects [1] and [2].

[1] A water-based ink including a pigment, a water-insoluble polymer, an acetylene glycol-based nonionic surfactant (A) having HLB of not less than 0 and not more than 5, a nonionic surfactant (B) having HLB of not less than 6 and not more than 20, a polyether-modified silicone (C) having a kinematic viscosity of not less than 30 $mm^2/s$ and not more than 190 $mm^2/s$ as measured at 25° C. and an organic solvent (D), in which a weighted mean value of a boiling point of the organic solvent (D) is not lower than 150° C. and not higher than 230° C.

[2] An ink-jet printing method including the step of printing characters or images on a recording medium using the water-based ink according to the aforementioned aspect [1], in which the recording medium has a water absorption of not less than 0 $g/m^2$ and not more than 10 $g/m^2$ as measured in a pure water contact time of 100 milliseconds.

According to the present invention, there are provided a water-based ink that exhibits excellent ejection properties, and can be prevented from suffering from reduction in a dot size of the ink during a drying step thereof and is capable of obtaining printed characters or images having excellent uniformity, even when printed on a recording medium, in particular, a low-water absorbing recording medium, as well as an ink-jet printing method using the water-based ink.

Meanwhile, the term "low-water absorbing" as used in the present invention is a concept that is intended to include both of low-water absorbing and/or low-ink absorbing properties, and non-water absorbing and/or non-ink absorbing properties, more specifically, it means that a water absorption of the recording medium is not less than 0 $g/m^2$ and not more than 10 $g/m^2$ as measured under such a condition that a contact time between the recording medium and pure water is 100 milliseconds.

[Water-Based Ink]

The water-based ink of the present invention is characterized by including a pigment, a water-insoluble polymer, an acetylene glycol-based nonionic surfactant (A) having HLB of not less than 0 and not more than 5 (hereinafter also referred to merely as a "nonionic surfactant (A)"), a nonionic surfactant (B) having HLB of not less than 6 and not more than 20 (hereinafter also referred to merely as a "nonionic surfactant (B)"), a polyether-modified silicone (C) having a kinematic viscosity of not less than 30 $mm^2/s$ and not more than 190 $mm^2/s$ as measured at 25° C. (hereinafter also referred to merely as a "polyether-modified silicone (C)") and an organic solvent (D), in which a weighted mean value of a boiling point of the organic solvent (D) is not lower than 150° C. and not higher than 230° C.

According to the water-based ink of the present invention, it is possible to exhibit excellent ejection properties, and suppress reduction in a dot size of the ink during a drying step thereof and obtain printed characters or images having excellent uniformity, even when printed on a low-water absorbing recording medium. Therefore, the water-based ink of the present invention is preferably used as a water-based ink for ink-jet printing, and may also be used as an ink for flexo printing or gravure printing.

Meanwhile, the term "water-based" as used herein means that water has a largest content among components of a medium contained in the ink, and the medium used for the ink may be constituted of not only water solely but also a mixed solvent containing water and one or more kinds of organic solvents.

The reason why the aforementioned advantageous effects of exhibiting excellent ejection properties as well as suppressing reduction in a dot size of the ink during a drying step thereof and obtaining printed characters or images having excellent uniformity, even when printed on a low-water absorbing recording medium, can be attained by the present invention is considered as follows, though it is not clearly determined yet.

That is, when conducting ink-jet recording (printing) on a low-water absorbing recording medium, the water-based ink remains in the form of droplets on the recording medium without being absorbed into the recording medium. It is estimated that the acetylene glycol-based nonionic surfactant (A) having HLB of not less than 0 and not more than 5 acts for reducing a surface tension of the water-based ink and promoting spreading of the droplets of the ink over the recording medium, whereas the polyether-modified silicone (C) in the ink droplets is oriented on the surface of the thus wet-spread droplets of the ink to suppress reduction in a dot size of the droplets of the ink during a drying step thereof. It is thus considered that the kinematic viscosity of the polyether-modified silicone (C) can be used as an index of the orientation thereof on the surface of the droplets of the ink during a drying step thereof. It is also estimated that the nonionic surfactant (B) having HLB of not less than 6 and not more than 20 acts for stably dispersing the nonionic surfactant (A) and the polyether-modified silicone (C) in the water-based ink. In addition, it is considered that by incorporating the nonionic surfactants (A) and (B) each having a specific HLB value and the polyether-modified silicone (C) having a specific kinematic viscosity in the water-based ink, the surfactants are concentrated on the surface of nozzles to thereby suppress drying of the water-based ink, so that the resulting water-based ink is excellent in ejection properties.

Furthermore, it is considered that by incorporating the organic solvent (D) into the water-based ink, the characters or images which are printed on a low-water absorbing recording medium by an ink-jet printing method can be improved in image uniformity owing to spreading of the ink dots, so that the ink can be prevented from drying in the ink-jet nozzles and therefore can be improved in ejection properties.

<Water-Based Ink>

The water-based ink of the present invention includes the pigment, the water-insoluble polymer, the nonionic surfactant (A), the nonionic surfactant (B), the polyether-modified silicone (C) and the organic solvent (D).

In the following, the respective components used in the present invention are described.

<Pigment>

In the water-based ink of the present invention, from the viewpoint of improving water resistance and weathering resistance of printed characters or images, the pigment is used as a colorant thereof. The pigment is not particularly limited and may be used in any of configurations including (i) a self-dispersible pigment, (ii) a water-soluble polymer-dispersed pigment, (iii) pigment-containing water-insoluble polymer particles, etc. Of these pigments, preferred are the pigment-containing water-insoluble polymer particles (iii). Also, in the case where the pigment is used in the form of the self-dispersible pigment (i) or the water-soluble polymer-dispersed pigment (ii), the below-mentioned water-insoluble polymer particles Q may be used as the water-insoluble polymer to be incorporated into the ink of the present invention.

The pigment used in the present invention may be either an inorganic pigment or an organic pigment. The inorganic or organic pigment may be used in combination with an extender pigment, if required.

Examples of the inorganic pigment include carbon blacks, metal oxides, metal sulfides and metal chlorides. Of these inorganic pigments, in particular, carbon blacks are preferably used for black water-based inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments. The hue of the organic pigment used in the present invention is not particularly limited, and there may be used any chromatic color pigment having a yellow color, a magenta color, a cyan color, a blue color, a red color, an orange color, a green color, etc.

Specific examples of the preferred organic pigments include one or more pigments selected from the group consisting of commercially available products marketed under the tradenames of C.I. Pigment Yellow, C.I. Pigment Red, C.I. Pigment Orange, C.I. Pigment Violet, C.I. Pigment Blue and C.I. Pigment Green with various product numbers.

Examples of the extender pigment include silica, calcium carbonate and talc.

The aforementioned pigments may be used alone or in the form of a mixture of any two or more thereof.

The content of the pigment in the water-based ink is preferably not less than 1% by mass, more preferably not less than 2% by mass and even more preferably not less than 3% by mass from the viewpoint of enhancing optical density of the ink when printed on a high-water absorbing recording medium and promoting drying of the ink on a paper and enhancing optical density of the ink when printed on a low-water absorbing recording medium, and is also preferably not more than 15% by mass, more preferably not more than 10% by mass and even more preferably not more than 6% by mass from the viewpoint of reducing viscosity of the ink upon evaporation of the solvent therefrom, suppressing reduction in a dot size of the ink during a drying step thereof when printed on a low-water absorbing recording medium and obtaining printed characters or images having excellent uniformity as well as from the viewpoint of enhancing optical density of the ink and improving storage stability and ejection properties of the water-based ink. The pigment may be used in the form of a water dispersion thereof. The amount of the pigment water dispersion compounded in the water-based ink may be determined such that the content of the pigment in the water-based ink lies within the aforementioned range.

(i) Self-Dispersible Pigment

The self-dispersible pigment that may be used in the present invention means a pigment onto the surface of which at least one hydrophilic functional group (including an anionic hydrophilic group such as a carboxy group and a sulfonic group or a cationic hydrophilic group such as a quaternary ammonium group) is bonded either directly or through the other atom group such as an alkanediyl group having 1 to 12 carbon atoms to thereby render the pigment dispersible in an aqueous medium without using a surfactant or a resin. In order to convert the pigment into the self-dispersible pigment, for example, a necessary amount of the hydrophilic functional group may be chemically bonded to the surface of the pigment by an ordinary method. Examples of commercially available products of the self-dispersible pigment include "CAB-O-JET 200", "CAB-O-JET 300", "CAB-O-JET 352K", "CAB-O-JET 250C", "CAB-O-JET 260M", "CAB-O-JET 270Y", "CAB-O-JET 450C", "CAB-O-JET 465M", "CAB-O-JET 470Y" and "CAB-O-JET 480V" all available from Cabot Corp., "BONJET CW-1" and "BONJET CW-2" both available from Orient Chemical Industries Co., Ltd., "Aqua-Black 162" available from Tokai Carbon Co., Ltd., and "SDP-100", "SDP-1000" and "SDP-2000" all available from Sensient Technologies Corporation. The self-dispersible pigment is preferably used in the form of a water dispersion prepared by dispersing the pigment in water.

(ii) Water-Soluble Polymer-Dispersed Pigment

The water-soluble polymer-dispersed pigment is preferably in the form of a water dispersion prepared by dispersing the pigment in water with a water-soluble polymer. Examples of the water-soluble polymer include carboxy group-containing copolymers that contain acrylic acid or methacrylic acid as a constituent thereof. Examples of commercially available products of the water-soluble polymer include "JONCRYL 67", "JONCRYL 678", "JONCRYL 683" and "JONCRYL 60J", etc.

The water-soluble polymer-dispersed pigment is preferably used in the form of a pigment-containing water dispersion prepared by adding the pigment into water in which the water-soluble polymer is dissolved, and dispersing the resulting mixture by applying a shear stress thereto. As a means for applying a shear stress to the mixture, there may be used, for example, kneading machines such as roll mills and kneaders, high-pressure homogenizers such as "Microfluidizer" available from Microfluidics Corporation and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof.

(iii) Pigment-Containing Water-Insoluble Polymer Particles

The water-based ink of the present invention preferably contains water-insoluble polymer particles from the viewpoint of improving fusing properties of printed characters or images when printed on a low-water absorbing recording medium. The nonionic surfactant (A), the nonionic surfactant (B) and the polyether-modified silicone (C) incorporated in the water-based ink of the present invention serves for improving dispersion stability of the water-insoluble polymer particles in the water-based ink, so that the resulting ink is excellent in ejection properties. As one of preferred forms of the water-insoluble polymer particles, from the viewpoint of improving fusing properties of printed characters or images when printed on a low-water absorbing recording medium, the pigment and the water-insoluble polymer are more preferably used in the form of pigment-containing water-insoluble polymer particles (hereinafter also referred to as "pigment-containing polymer particles P").

The configuration of the pigment-containing polymer particles P is not particularly limited, and the pigment-containing polymer particles P may have any configuration as long as the particles are formed of at least the pigment and the water-insoluble polymer p. Examples of the configuration of the pigment-containing polymer particles P include the particle configuration in which the pigment is enclosed (encapsulated) in the water-insoluble polymer p, the particle configuration in which the pigment is uniformly dispersed in the water-insoluble polymer p, and the particle configuration in which the pigment is exposed onto the surface of the respective particles of the water-insoluble polymer p, as well as mixtures of these configurations.

(Water-Insoluble Polymer p)

The water-insoluble polymer p constituting the pigment-containing polymer particles P has not only a function as a dispersant for dispersing the pigment in an aqueous medium and maintaining dispersion stability of the resulting dispersion, but also a function as a fusing agent for fusing the resulting ink on the recording medium.

The term "water-insoluble polymer" as used herein means a polymer that is undissolved in water and precipitated therein, or a polymer having a detectable particle diameter, more specifically, a polymer having a particle diameter of preferably not less than 20 nm and more preferably not less than 50 nm as observed, when the polymer is dried to constant weight at 105° C. for 2 hours and then added into water for dissolving the polymer therein. In the case where the water-insoluble polymer is an anionic polymer, the procedure for judging whether or not the polymer is soluble in water is conducted under such a condition that an anionic group of the polymer is neutralized completely (100%) with sodium hydroxide.

Examples of the polymer used in the present invention include polyesters, polyurethanes and vinyl-based polymers. Among these polymers, preferred are vinyl-based polymers obtained by addition-polymerizing a vinyl monomer (such as vinyl compounds, vinylidene compounds and vinylene compounds), from the viewpoint of improving storage stability of the resulting ink.

The water-insoluble polymer p is preferably a vinyl-based polymer that contains at least one constitutional unit selected from the group consisting of a constitutional unit derived from an ionic monomer (p-1), a constitutional unit derived from an aromatic ring-containing hydrophobic monomer (p-2) and a constitutional unit derived from a hydrophilic nonionic monomer (p-3) represented by the below-mentioned formula (1), more preferably a vinyl-based polymer that contains at least two constitutional units selected from the group consisting of the aforementioned constitutional units, and even more preferably a vinyl-based polymer that contains the all of aforementioned three constitutional units.

The water-insoluble polymer p may be produced, for example, by subjecting the ionic monomer (p-1), the aromatic ring-containing hydrophobic monomer (p-2) and the hydrophilic nonionic monomer (p-3) represented by the below-mentioned formula (1) to addition polymerization by conventionally known methods.

[Ionic Monomer (p-1)]

The ionic monomer (p-1) is used as a monomer component of the water-insoluble polymer p upon producing the below-mentioned "water dispersion of the pigment-containing polymer particles P" (hereinafter also referred to merely as a "pigment water dispersion") from the viewpoint of improving dispersion stability of the pigment water dispersion and storage stability of the water-based ink.

Examples of the ionic monomer (p-1) include anionic monomers and cationic monomers. Among these monomers, from the viewpoint of improving dispersion stability of the pigment water dispersion and storage stability of the water-based ink as well as from the viewpoint of improving ejecting properties of the resulting ink, preferred are anionic monomers. Meanwhile, the ionic monomer may include those monomers that have no ionicity under neutral conditions, such as an acid, an amine compound and the like, but are rendered ionic under acid or alkaline conditions.

Examples of the anionic monomers include at least one monomer selected from the group consisting of carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid and 3-sulfopropyl (meth)acrylate.

Specific examples of the phosphoric acid monomers include vinylphosphonic acid, vinyl phosphate, bis(methacryloxyethyl)phosphate, diphenyl-2-acryloyloxyethyl phosphate and diphenyl-2-methacryloyloxyethyl phosphate.

Among the aforementioned anionic monomers, from the viewpoint of improving dispersion stability of the pigment water dispersion and storage stability of the water-based ink, preferred are the carboxylic acid monomers, more preferred are acrylic acid and methacrylic acid, and even more preferred is methacrylic acid.

Meanwhile, the term "(meth)acrylate" means at least one compound selected from the group consisting of a methacrylate and an acrylate, and is hereinafter defined in the same way.

Examples of the cationic monomers include at least one monomer selected from the group consisting of unsaturated tertiary amine-containing vinyl monomers and unsaturated ammonium salt-containing vinyl monomers.

Specific examples of the unsaturated tertiary amine-containing vinyl monomers include N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, N,N-dimethylarylamines, vinyl pyrrolidone, 2-vinyl pyridine, 4-vinyl pyridine, 2-methyl-6-vinyl pyridine and 5-ethyl-2-vinyl pyridine.

Specific examples of the unsaturated ammonium salt-containing vinyl monomers include a quaternarized product of N,N-dimethylaminoethyl (meth)acrylate, a quaternarized product of N,N-diethylaminoethyl (meth)acrylate and a quaternarized product of N,N-dimethylaminopropyl (meth)acrylate.

Of these cationic monomers, preferred are N,N-dimethylaminoethyl (meth)acrylate, N,N-dimethylaminopropyl (meth)acrylamide and vinyl pyrrolidone.

[Aromatic Ring-Containing Hydrophobic Monomer (p-2)]

The aromatic ring-containing hydrophobic monomer (p-2) is used from the viewpoint of improving dispersion stability of the pigment water dispersion and storage stability of the water-based ink as well as from the viewpoint of improving ejection properties of the water-based ink by suppressing increase in viscosity of the water-based ink upon drying thereof.

Examples of the aromatic ring-containing hydrophobic monomer (p-2) include at least one monomer selected from the group consisting of a styrene-based monomer, an aromatic group-containing (meth)acrylate and a styrene-based macromonomer.

As the styrene-based monomer, from the same viewpoint as described above, preferred are styrene and 2-methyl styrene, and more preferred is styrene.

As the aromatic group-containing (meth)acrylate, from the same viewpoint as described above, preferred are benzyl (meth)acrylate and phenoxyethyl (meth)acrylate, and more preferred is benzyl (meth)acrylate.

The styrene-based macromonomer is a compound having a number-average molecular weight of not less than 500 and not more than 100,000 which contains a polymerizable functional group at one terminal end thereof. The number-average molecular weight of the styrene-based macromonomer is preferably not less than 1,000, more preferably not less than 2,000 and even more preferably not less than 3,000, and is also preferably not more than 10,000, more preferably not more than 9,000 and even more preferably not more than 8,000, from the same viewpoint as described above. Meanwhile, the number-average molecular weight may be measured by gel permeation chromatography using chloroform containing 1 mmol/L of dodecyldimethylamine as a solvent and further using polystyrene as a reference standard substance.

Examples of the commercially available styrene-based macromonomer include AS-6(S), AN-6(S) and HS-6(S) (tradenames: all available from Toagosei Co., Ltd.), etc.

As the aromatic ring-containing hydrophobic monomer (p-2), from the same viewpoint as described above, preferred is a combination of at least two kinds of compounds selected from the group consisting of the styrene-based monomer, the aromatic group-containing (meth)acrylate and the styrene-based macromonomer, and more preferred is a combination of styrene or benzyl (meth)acrylate with the styrene-based macromonomer.

[Hydrophilic Nonionic Monomer (p-3) Represented by Formula (1)]

The hydrophilic nonionic monomer (p-3) represented by the formula (1) is used from the viewpoint of improving dispersion stability of the pigment water dispersion and storage stability of the water-based ink as well as from the viewpoint of improving ejection properties of the water-based ink by suppressing increase in viscosity of the water-based ink upon drying thereof.

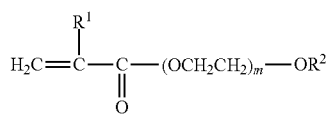

(1)

wherein $R^1$ is a hydrogen atom or a methyl group; $R^2$ is a hydrogen atom, an alkyl group having not less than 1 and not more than 20 carbon atoms or a phenyl group whose hydrogen atoms may be substituted with an alkyl group having not less than 1 and not more than 9 carbon atoms; and m represents an average molar number of addition of ethyleneoxy ($OCH_2CH_2$) groups and is a number of not less than 2 and not more than 100.

In the aforementioned formula (1), $R^1$ is a hydrogen atom or a methyl group, and preferably a methyl group from the viewpoint of improving dispersion stability of the pigment water dispersion and storage stability of the water-based ink.

$R^2$ is preferably a hydrogen atom or an alkyl group having not less than 1 and not more than 20 carbon atoms, more preferably an alkyl group having not less than 1 and not more than 10 carbon atoms, even more preferably an alkyl group having not less than 1 and not more than 3 carbon atoms and even more preferably a methyl group from the viewpoint of improving dispersion stability of the pigment water dispersion and storage stability of the water-based ink.

In the aforementioned formula (1), m is preferably a number of not less than 2, more preferably not less than 3 and even more preferably not less than 4, and also preferably a number of not more than 50, more preferably not more than 20 and even more preferably not more than 10, from the viewpoint of improving storage stability and ejection properties of the water-based ink.

Examples of the monomer (p-3) represented by the aforementioned formula (1) include at least one monomer selected from the group consisting of polyethylene glycol mono(meth)acrylate, methoxypolyethylene glycol mono(meth)acrylate, octoxypolyethylene glycol mono(meth)acrylate and stearoxypolyethylene glycol mono(meth)acrylate. Among these monomers, preferred is methoxypolyethylene glycol mono(meth)acrylate.

Specific examples of the commercially available products of the monomer represented by the aforementioned formula (1) include "NK ESTER M-20G", "NK ESTER M-23G", "NK ESTER M-40G", "NK ESTER M-60G", "NK ESTER M-90G", "NK ESTER M-230G", "NK ESTER M-450G" and "NK ESTER M-900G" all available from Shin-Nakamura Chemical Co., Ltd., "BLEMMER PME-200" available from NOF Corporation, and "LIGHT ESTER MTG" and "LIGHT ESTER 041MA" both available from Kyoeisha Chemical Co., Ltd., etc.

The aforementioned monomers (p-1), (p-2) and (p-3) may be respectively used alone or in the form of a mixture of any two or more thereof.

The water-insoluble polymer p used in the present invention may also contain constitutional units derived from monomers other than the aforementioned monomers (p-1), (p-2) and (p-3) unless the advantageous effects of the present invention are adversely affected.

Examples of the other monomers include alkyl (meth)acrylates having 1 to 22 carbon atoms such as methyl (meth)acrylate and 2-ethylhexyl (meth)acrylate; hydroxyalkyl (meth)acrylates such as 2-hydroxyethyl (meth)acrylate and 3-hydroxypropyl (meth)acrylate; and silicone-based macromonomers such as organopolysiloxanes having a polymerizable functional group at one terminal end thereof.

The contents of the aforementioned monomers (p-1), (p-2) and (p-3) in a mixture containing these monomers (hereinafter also referred to merely as a "monomer mixture") (contents of non-neutralized components; hereinafter defined in the same way) upon production of the water-insoluble polymer p, or the contents of the respective constitutional units derived from the aforementioned monomers (p-1), (p-2) and (p-3) in the water-insoluble polymer p produced are as follows, from the viewpoint of improving dispersion stability of the pigment water dispersion and storage stability of the water-based ink as well as from the viewpoint of improving ejection properties of the water-based ink by suppressing increase in viscosity of the water-based ink upon drying thereof.

In the case where the ionic monomer (p-1) is incorporated, the content of the ionic monomer (p-1) is preferably not less than 3% by mass, more preferably not less than 5% by mass, even more preferably not less than 8% by mass and further even more preferably not less than 10% by mass, and is also preferably not more than 40% by mass, more preferably not more than 30% by mass, even more preferably not more than 25% by mass and further even more preferably not more than 20% by mass.

In the case where the aromatic ring-containing hydrophobic monomer (p-2) is incorporated, the content of the aromatic ring-containing hydrophobic monomer (p-2) is preferably not less than 15% by mass, more preferably not less than 30% by mass, even more preferably not less than 37% by mass and further even more preferably not less than 45% by mass, and is also preferably not more than 84% by mass, more preferably not more than 80% by mass, even more preferably 74% by mass and further even more preferably 70% by mass.

In the case where the styrene-based macromonomer is incorporated as the monomer (p-2), the styrene-based macromonomer is preferably used in combination with the other monomer (p-2) such as the styrene-based monomer and/or the aromatic group-containing (meth)acrylate. The content of the styrene-based macromonomer is preferably not less than 5% by mass, more preferably not less than 15% by mass and even more preferably not less than not less than 20% by mass, and is also preferably not more than 40% by mass, more preferably not more than 35% by mass and even more preferably not more than 30% by mass.

In the case where the hydrophilic nonionic monomer (p-3) is incorporated, the content of the hydrophilic nonionic monomer (p-3) is preferably not less than 13% by mass, more preferably not less than 15% by mass, even more preferably not less than 18% by mass and further even more preferably not less than 20% by mass, and is also preferably not more than 45% by mass, more preferably not more than 40% by mass, even more preferably not more than 38% by mass and further even more preferably not more than 35% by mass.

In the case where the monomers (p-1), (p-2) and (p-3) are incorporated, the mass ratio of the component (p-1) to a sum of the component (p-2) and the component (p-3) {component (p-1)/[component (p-2)+component (p-3)]} is preferably not less than 0.03, more preferably not less than 0.05 and even more preferably not less than 0.10, and is also preferably not more than 0.50, more preferably not more than 0.40 and even more preferably not more than 0.30, from the viewpoint of improving dispersion stability of the pigment water dispersion and storage stability of the water-based ink.

(Production of Water-Insoluble Polymer p)

The water-insoluble polymer p may be produced by copolymerizing the aforementioned monomer mixture by known polymerization methods. Among the polymerization methods, preferred is a solution polymerization method.

The organic solvent a used in the solution polymerization method is not particularly limited, and is preferably at least one compound selected from the group consisting of ketones having not less than 4 and not more than 8 carbon atoms, alcohols, ethers and esters from the viewpoint of enhancing productivity of the below-mentioned pigment water dispersion. Of these compounds, from the same viewpoint as described above, more preferred are ketones having not less than 4 and not more than 8 carbon atoms, and even more preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile) or the like. As the chain transfer agent, preferred are mercaptans, and more preferred is 2-mercaptoethanol or the like.

The preferred polymerization conditions may vary depending upon the kind of polymerization initiator used, etc. The polymerization temperature is preferably not lower than 50° C. and not higher than 90° C., and the polymerization time is preferably not shorter than 1 hour and not longer than 20 hours. Furthermore, the polymerization is preferably conducted in a nitrogen gas atmosphere or an atmosphere of an inert gas such as argon.

After completion of the polymerization reaction, the polymer thus produced may be isolated from the reaction solution by a known method such as reprecipitation and removal of the solvent by distillation. In addition, the thus obtained polymer may be subjected to reprecipitation, membrane separation, chromatography, extraction, etc., for removing unreacted monomers, etc., therefrom.

The water-insoluble polymer p is preferably used as such in the form of a polymer solution without removing the solvent used in the polymerization reaction therefrom in order to use the organic solvent a contained therein as the below-mentioned organic solvent b from the viewpoint of enhancing productivity of the pigment water dispersion.

The solid content of the solution of the water-insoluble polymer p is preferably not less than 25% by mass and more preferably not less than 30% by mass, and is also preferably not more than 60% by mass, more preferably not more than 50% by mass and even more preferably not more than 45% by mass from the viewpoint of enhancing productivity of the pigment water dispersion.

The weight-average molecular weight of the water-insoluble polymer p used in the present invention is preferably not less than 10,000, more preferably not less than 15,000, even more preferably not less than 20,000 and further even more preferably not less than 30,000 from the viewpoint of improving dispersion stability of the pigment water dispersion and storage stability of the water-based ink, and is also preferably not more than 150,000 and more preferably not more than 100,000 from the viewpoint of improving dispersion stability of the pigment water dispersion and storage stability of the water-based ink as well as from the viewpoint of improving ejection properties of the water-based ink by suppressing increase in viscosity of the water-based ink upon drying thereof. Meanwhile, the weight-average molecular weight of the water-insoluble polymer p may be measured by the method described in Examples below.

(Production of Pigment-Containing Polymer Particles P)

The pigment-containing polymer particles P are preferably produced in the form of a water dispersion of the pigment-containing polymer particles P (pigment water dispersion) from the viewpoint of enhancing productivity of the water-based ink.

The pigment water dispersion may be produced by the process including the following steps (1) and (2).

Step (1): subjecting a mixture containing the water-insoluble polymer p, the organic solvent b, the pigment and water (hereinafter also referred to merely as a "pigment mixture") to dispersion treatment to obtain a dispersion treatment product; and Step (2): removing the organic solvent b from the dispersion treatment product obtained in the step (1) to obtain the pigment water dispersion.

<Step (1)>

In the step (1), the mixture containing the water-insoluble polymer p, the organic solvent b, the pigment and water (pigment mixture) was subjected to dispersion treatment to obtain the dispersion treatment product.

In the step (1), first, the water-insoluble polymer p, the organic solvent b, the pigment and water, if required, together with a neutralizing agent, a surfactant and the like, are preferably mixed with each other to obtain the pigment mixture. The order of addition of the respective components is not particularly limited, and it is preferred that the water-insoluble polymer p, the organic solvent b, the neutralizing agent, water and the pigment are successively added in this order.

(Organic Solvent b)

The organic solvent b used in the step (1) is not particularly limited, and is preferably selected from aliphatic alcohols having not less than 1 and not more than 3 carbon atoms, ketones having not less than 4 and not more than 8 carbon atoms, ethers, esters and the like. Of these organic solvents, from the viewpoint of improving wettability to the pigment, solubility of the water-insoluble polymer p therein and adsorption of the water-insoluble polymer p to the pigment, more preferred are ketones having not less than 4 and not more than 8 carbon atoms, even more preferred are methyl ethyl ketone and methyl isobutyl ketone, and further even more preferred is methyl ethyl ketone.

When the water-insoluble polymer p is synthesized by the solution polymerization method, the solvent that has been used in the solution polymerization method may be directly used as such in the step (1).

The mass ratio of the water-insoluble polymer p to the organic solvent b [water-insoluble polymer p/organic solvent b] is preferably not less than 0.10, more preferably not less than 0.15 and even more preferably not less than 0.20, and is also preferably not more than 0.70, more preferably not more than 0.60 and even more preferably not more than 0.50, from the viewpoint of improving wettability to the pigment and adsorption of the water-insoluble polymer p to the pigment.

(Neutralizing Agent)

In the present invention, from the viewpoint of improving dispersion stability of the pigment water dispersion as well as storage stability and ejection properties of the water-based ink, there may be used a neutralizing agent. When using the neutralizing agent, the pH value of the pigment water dispersion is preferably controlled to not less than 7 and more preferably not less than 7.5, and is also preferably controlled to not more than 11 and more preferably not more than 9.5.

Examples of the neutralizing agent include hydroxides of alkali metals, ammonia and organic amines.

Specific examples of the hydroxides of alkali metals include lithium hydroxide, sodium hydroxide, potassium hydroxide and cesium hydroxide. Among these hydroxides of alkali metals, preferred is sodium hydroxide.

Specific examples of the organic amines include trimethylamine, ethylamine, diethylamine, triethylamine and triethanolamine.

As the neutralizing agent, from the viewpoint of improving dispersion stability of the pigment water dispersion as well as storage stability and ejection properties of the water-based ink, preferred are the hydroxides of alkali metals and ammonia, and more preferred is a combination of sodium hydroxide and ammonia. In addition, the water-insoluble polymer p may be previously neutralized.

The neutralizing agent is preferably used in the form of an aqueous neutralizing agent solution from the viewpoint of accelerating neutralization of the polymer in a sufficient and homogeneous manner. From the same viewpoint as described above, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The mass ratio of the aqueous neutralizing agent solution to the organic solvent b [aqueous neutralizing agent solution/organic solvent b] is preferably not less than 0.01, more preferably not less than 0.05 and even more preferably not less than 0.10, and is also preferably not more than 0.50, more preferably not more than 0.30 and even more preferably not more than 0.20 from the viewpoint of promoting adsorption of the water-insoluble polymer p to the pigment and neutralization of the polymer, improving dispersion stability of the pigment dispersion and storage stability of the water-based ink, reducing an amount of coarse particles formed, and improving ejection properties of the water-based ink.

The neutralizing agent and the aqueous neutralizing agent solution may be respectively used alone or in the form of a mixture of any two or more kinds thereof.

The degree of neutralization of the water-insoluble polymer p is preferably not less than 30 mol %, more preferably not less than 40 mol % and even more preferably not less than 50 mol %, and is also preferably not more than 300 mol %, more preferably not more than 200 mol % and even more preferably not more than 150 mol % from the viewpoint of improving dispersion stability of the pigment water dispersion and storage stability of the water-based ink, reducing an amount of coarse particles formed, and improving ejection properties of the water-based ink.

Furthermore, from the viewpoint of improving dispersibility of the water-insoluble polymer p in water, the degree of neutralization of the polymer by the hydroxides of alkali metals among the aforementioned neutralizing agents is preferably not less than 30 mol %, more preferably not less than 40 mol % and even more preferably not less than 50 mol %, and is also preferably not more than 150 mol %, more preferably not more than 125 mol % and even more preferably not more than 100 mol %.

The degree of neutralization of the water-insoluble polymer p as used therein means the calculated value obtained by dividing a mole equivalent amount of the neutralizing agent by a molar amount of an anionic group in the water-insoluble polymer p.

(Contents of Respective Components in Pigment Mixture, Etc.)

The content of the pigment in the pigment mixture is preferably not less than 10% by mass, more preferably not less than 12% by mass and even more preferably not less than 14% by mass, and is also preferably not more than 30% by mass, more preferably not more than 25% by mass and even more preferably not more than 20% by mass from the viewpoint of improving dispersion stability of the pigment water dispersion and storage stability and ejection properties of the water-based ink as well as from the viewpoint of enhancing productivity of the pigment water dispersion.

The content of the water-insoluble polymer p in the pigment mixture is preferably not less than 2.0% by mass, more preferably not less than 4.0% by mass and even more preferably not less than 5.0% by mass, and is also preferably not more than 15% by mass, more preferably not more than 10% by mass and even more preferably not more than 8.0% by mass, from the viewpoint of improving dispersion stability of the pigment water dispersion as well as storage stability and ejection properties of the water-based ink.

The content of the organic solvent b in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass, from the viewpoint of improving wettability to the pigment and adsorption of the water-insoluble polymer p to the pigment.

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass, from the viewpoint of improving dispersion stability of the pigment water dispersion as well as from the viewpoint of enhancing productivity of the pigment water dispersion.

The mass ratio of the pigment to the water-insoluble polymer p [pigment/water-insoluble polymer p] is preferably not less than 0.4, more preferably not less than 1 and even more preferably not less than 1.5, and is also preferably not more than 9, more preferably not more than 6 and even more preferably not more than 4, from the viewpoint of reducing viscosity of the ink upon evaporation of the solvent therefrom as well as from the viewpoint of improving storage stability and ejection properties of the water-based ink.

(Dispersion of Pigment Mixture)

In the step (1), the pigment mixture is further dispersed to obtain a dispersion treatment product. The dispersing method for obtaining the dispersion treatment product in the step (1) is not particularly limited. The pigment particles may be atomized into fine particles having a desired average particle size only by a substantial dispersion treatment. However, it is preferred that the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step (1) is preferably not lower than 0° C., and is also preferably not higher than 40° C., more preferably not higher than 30° C. and even more preferably not higher than 20° C. The dispersing time is preferably not shorter than 0.5 hour and more preferably not shorter than 1 hour, and is also preferably not longer than 30 hours, more preferably not longer than 10 hours and even more preferably not longer than 5 hours.

When subjecting the pigment mixture to the preliminary dispersion treatment, there may be used ordinary mixing or stirring devices such as anchor blades and disper blades. Of these mixing or stirring devices, preferred are high-speed stirring mixers.

The temperature used in the substantial dispersion treatment in the step (1) is preferably not lower than 0° C., and is also preferably not higher than 40° C., more preferably not higher than 30° C. and even more preferably not higher than 20° C.

As a means for applying a shear stress to the pigment mixture in the substantial dispersion treatment, there may be used, for example, kneading machines such as roll mills and kneaders, high-pressure homogenizers such as "Microfluidizer" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling a pressure used in the substantial dispersion treatment or the number of passes of the dispersion through the devices.

The pressure used in the substantial dispersion treatment is not less than 60 MPa, more preferably not less than 100 MPa and even more preferably not less than 130 MPa, and is also preferably not more than 200 MPa, more preferably not more than 180 MPa and even more preferably not more than 170 MPa, from the viewpoint of enhancing productivity and cost efficiency.

The number of passes of the dispersion through the devices is preferably not less than 3, more preferably not less than 5 and even more preferably not less than 7, and is also preferably not more than 30, more preferably not more than 25 and even more preferably not more than 15.

<Step (2)>

In the step (2), the organic solvent b is removed from the dispersion treatment product obtained in the step (1) to obtain the pigment water dispersion. The removal of the organic pigment b may be conducted by conventionally known methods.

From the viewpoint of suppressing formation of aggregates in the step of removing the organic solvent b and improving dispersion stability of the pigment water dispersion as well as storage stability and ejection properties of the water-based ink, it is preferred that water is added to the dispersion treatment product obtained in the step (1) before removing the organic solvent b therefrom to suitably control the mass ratio of the organic solvent b to water (organic solvent b/water).

The mass ratio of the organic solvent b to water (organic solvent b/water) is preferably not less than 0.08 and more preferably not less than 0.10, and is also preferably not more than 0.40 and more preferably not more than 0.20.

The concentration of non-volatile components (solid components) in the pigment water dispersion after controlling the mass ratio of the organic solvent b to water (organic solvent b/water) is preferably not less than 5% by mass, more preferably not less than 8% by mass and even more preferably not less than 10% by mass, and is also preferably not more than 30% by mass, more preferably not more than 25% by mass and even more preferably not more than 20% by mass, from the viewpoint of suppressing formation of aggregates in the step of removing the organic solvent b as well as from the viewpoint of enhancing productivity of the pigment water dispersion. Meanwhile, a part of water contained in the pigment water dispersion may be removed simultaneously with removal of the organic solvent b.

Examples of the apparatus used for removing the organic solvent b in the step (2) include a thin film distillation apparatus such as a batch simple distillation device, a reduced pressure distillation device and a flash evaporator, a rotary distillation device and a stirring evaporator. Among these apparatuses, from the viewpoint of efficiently removing the organic solvent b, preferred are a rotary distillation device and a stirring evaporator. Among the rotary distillation devices, more preferred is a rotary reduced pressure distillation device such as a rotary evaporator. Whereas, among the stirring evaporators, more preferred is an agitated tank thin film evaporator.

The temperature of the dispersion treatment product upon removal of the organic solvent b may be appropriately selected depending upon the kind of organic solvent b to be removed. The temperature of the dispersion treatment product upon removal of the organic solvent b under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The pressure of the reaction system upon removal of the organic solvent b is preferably not less than 0.01 MPa, more preferably not less than 0.02 MPa and even more preferably not less than 0.05 MPa, and is also preferably not more than 0.5 MPa, more preferably not more than 0.2 MPa and even more preferably not more than 0.1 MPa.

The time required for removal of the organic solvent b is preferably not shorter than 1 hour, more preferably not shorter than 2 hours and even more preferably not shorter than 5 hours, and is also preferably not longer than 24 hours, more preferably not longer than 12 hours and even more preferably not longer than 10 hours.

The removal of the organic solvent b is continued until the solid content of the resulting concentrated dispersion reaches preferably not less than 10% by mass and more preferably not less than 20% by mass, and also until the solid content of the concentrated dispersion reaches preferably not more than 35% by mass and more preferably not more than 30% by mass.

The thus obtained concentrated product is preferably subjected to centrifugal separation treatment to separate the concentrated product into a liquid layer portion and a solid portion, thereby recovering the liquid layer portion. The thus recovered liquid layer portion is mainly formed of a dispersion of the pigment-containing polymer particles P in water, whereas the solid portion is mainly formed of coarse particles produced owing to poor dispersion or aggregation of the particles. Therefore, the pigment waster dispersion is obtained from the liquid layer portion.

From the viewpoint of preventing the resulting pigment water dispersion from being dried and suffering from putrefaction thereof, a humectant such as glycerin, an antiseptic agent, a mildew-proof agent or the like is preferably added to the pigment water dispersion.

The organic solvent b is preferably substantially completely removed from the thus obtained pigment water dispersion. However, the residual organic solvent b may be present in the pigment water dispersion unless the objects and effects of the present invention are adversely affected by the residual organic solvent. The content of the residual organic solvent b in the resulting pigment water dispersion is preferably not more than 0.1% by mass and more preferably not more than 0.01% by mass.

The concentration of the non-volatile components (solid components) in the resulting pigment water dispersion of the pigment-containing polymer particles P is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating preparation of the water-based ink.

In the thus-obtained pigment water dispersion of the pigment-containing polymer particles P, solid components formed of the pigment and the water-insoluble polymer p are dispersed in a dispersing medium containing water as a main medium.

The average particle size of the pigment-containing polymer particles P in the pigment water dispersion is preferably not less than 40 nm, more preferably not less than 60 nm and even more preferably not less than 80 nm, and is also preferably not more than 150 nm and more preferably not more than 140 nm, from the viewpoint of improving dispersion stability of the pigment water dispersion and storage stability of the water-based ink as well as from the viewpoint of improving ejection properties of the water-based ink by suppressing increase in viscosity of the water-based ink upon drying thereof.

Meanwhile, the average particle size of the pigment-containing polymer particles P may be measured by the method described in Examples below.

The average particle size of the pigment-containing polymer particles P in the water-based ink produced using the pigment-containing polymer particles P is the same as the average particle size of the particles in the pigment water dispersion, and the preferred range of the average particle size of the pigment-containing polymer particles P in the water-based ink is also the same as that of the average particle size of the particles in the pigment water dispersion.
(Content of Pigment-Containing Polymer Particles P)

In the case where the pigment-containing polymer particles P are incorporated as the pigment, the content of the pigment-containing polymer particles P in the water-based ink is preferably not less than 1.4% by mass, more preferably not less than 2.8% by mass and even more preferably not less than 4.2% by mass from the viewpoint of promoting drying of the ink on the surface of paper when printed on a low-water absorbing recording medium, suppressing reduction in a dot size of the ink during a drying step thereof and obtaining printed characters or images having excellent uniformity as well as from the viewpoint of enhancing optical density of the ink, and is also preferably not more than 21% by mass, more preferably not more than 14% by mass and even more preferably not more than 8.4% by mass from the viewpoint of reducing viscosity of the ink upon evaporation of the solvent therefrom, suppressing reduction in a dot size of the ink during a drying step thereof when printed on a low-water absorbing recording medium and obtaining printed characters or images having excellent uniformity as well as from the viewpoint of enhancing optical density of the water-based ink and improving storage stability and ejection properties of the water-based ink.
(Content of Water-Insoluble Polymer p)

In the case where the pigment-containing polymer particles P are incorporated, the content of the water-insoluble polymer p in the water-based ink is preferably not less than 0.4% by mass, more preferably not less than 0.8% by mass and even more preferably not less than 1.2% by mass from the viewpoint of improving storage stability and ejection properties of the water-based ink as well as from the viewpoint of suppressing reduction in a dot size of the ink during a drying step thereof when printed on a low-water absorbing recording medium and obtaining printed characters or images having excellent uniformity, and is also preferably not more than 6% by mass, more preferably not more than 4% by mass and even more preferably not more than 2.4% by mass from the viewpoint of reducing viscosity of the ink upon evaporation of the solvent therefrom, and increasing the dot size of the ink and enhancing optical density of the ink when printed on a low-water absorbing recording medium as well as from the viewpoint of improving storage stability and ejection properties of the water-based ink.

[Surfactants]

In the present invention, at least two kinds of surfactants, i.e., at least the acetylene glycol-based nonionic surfactant (A) having HLB of not less than 0 and not more than 5 and the nonionic surfactant (B) having HLB of not less than 6 and not more than 20 are used.

<Surfactant (A)>

The surfactant (A) used in the present invention is in the form of an acetylene glycol-based nonionic surfactant having HLB of not less than 0 and not more than 5.

The surfactant (A) is used for the purposes of improving wet-spreadability of the water-based ink, suppressing reduction in a dot size of the ink during a drying step thereof when printed on a low-water absorbing recording medium and obtaining printed characters or images having excellent uniformity. From the same viewpoint as described above, the HLB value of the surfactant (A) is preferably not more than 5.0, more preferably not more than 4.9 and even more preferably not more than 4.8. Also, from the viewpoint of improving solubility of the surfactant (A) in the water-based ink, the HLB value of the surfactant (A) is preferably not less than 2.0, more preferably not less than 2.5 and even more preferably not less than 2.8.

The term "HLB" (that represents a hydrophile-lypophile balance) as used herein means the value indicating an affinity of the surfactant to water and an oil, and can be calculated according to the following formula by Griffin method.

$$HLB = 20 \times [(\text{molecular weight of hydrophilic group contained in surfactant})/(\text{molecular weight of surfactant})]$$

Examples of the hydrophilic group contained in the surfactant include a hydroxy group and an ethyleneoxy group.

The average molar number of addition of ethyleneoxide (hereinafter also referred to merely as an "average molar number of addition of EO") of the surfactant (A) is preferably not more than 3.0, more preferably not more than 2.5, even more preferably not more than 2.0 and further even more preferably not more than 1.5.

Examples of the suitable surfactant (A) include at least one acetylene glycol selected from the group consisting of 2,4,7,9-tetramethyl-5-decyne-4,7-diol, 3,6-dimethyl-4-octyne-3,6-diol and 2,5-dimethyl-3-hexyne-2,5-diol, and ethyleneoxide adducts of these acetylene glycols. Of these compounds, from the viewpoint of improving wet-spreadability of the water-based ink and improving hiding power of the ink when printed on a low-water absorbing recording medium, preferred is at least one compound selected from the group consisting of 2,4,7,9-tetramethyl-5-decyne-4,7-diol, and an ethyleneoxide adduct of 2,4,7,9-tetramethyl-5-decyne-4,7-diol, and more preferred is 2,4,7,9-tetramethyl-5-decyne-4,7-diol.

2,4,7,9-Tetramethyl-5-decyne-4,7-diol, 3,6-dimethyl-4-octyne-3,6-diol and 2,5-dimethyl-3-hexyne-2,5-diol can be synthesized by reacting acetylene with a ketone or an aldehyde corresponding to the aimed acetylene glycol, and may be produced, for example, by the method described in Takehiko Fujimoto, a fully revised edition "New Introduction to Surfactants" published by Sanyo Chemical Industries, Ltd., 1992, pp. 94-107, etc.

Examples of commercially available products of the component (A) include "SURFYNOL 104" (2,4,7,9-tetramethyl-5-decyne-4,7-diol; average molar number of addition of EO): 0; HLB: 3.0), "SURFYNOL 104E" (50% ethylene glycol-diluted solution of 2,4,7,9-tetramethyl-5-decyne-4,7-diol), "SURFYNOL 104PG-50" (50% propylene glycol-diluted solution of 2,4,7,9-tetramethyl-5-decyne-4,7-diol) and "SURFYNOL 420" (1.3 mol (on the average) EO adduct of 2,4,7,9-tetramethyl-5-decyne-4,7-diol) all available from Nissin Chemical Industry Co., Ltd., and Air Products & Chemicals, Inc., and "ACETYLENOL E13T" (average molar number of addition of EO): 1.3; HLB: 4.7) available from Kawaken Fine Chemicals Co., Ltd., etc.

The content of the component (A) in the water-based ink is preferably not less than 0.4% by mass, more preferably not less than 0.6% by mass and even more preferably not less than 0.8% by mass from the viewpoint of improving wet-spreadability of the water-based ink and improving hiding power of the ink when printed on a low-water absorbing recording medium.

Also, from the viewpoint of improving ejection properties of the water-based ink and improving hiding power of the ink when printed on a low-water absorbing recording medium as well as from the viewpoint of improving storage stability of the ink, the content of the component (A) in the water-based ink is preferably not more than 4.0% by mass, more preferably not more than 3.0% by mass, even more preferably not more than 2.8% by mass and further even more preferably not more than 2.0% by mass.

<Surfactant (B)>

The surfactant (B) used in the present invention is a nonionic surfactant having HLB of not less than 6 and not more than 20.

The surfactant (B) is used for the purposes of improving solubility of the component (A) in the water-based ink and suppressing occurrence of turbidity of the ink. From the same viewpoint as described above, the HLB value of the surfactant (B) is preferably not less than 8, more preferably not less than 10, even more preferably not less than 12 and further even more preferably not less than 13. Also, from the viewpoint of improving ejection properties of the water-based ink, the HLB value of the surfactant (B) is preferably not more than 19, more preferably not more than 18.5, even more preferably not more than 17.5, further even more preferably not more than 17, still further even more preferably not more than 16.5 and still further even more preferably not more than 16.

Specific examples of the surfactant (B) include an ethyleneoxide adduct of acetylene glycol, an alkyleneoxide adduct of an alcohol and a fatty acid alkanol amide. Of these compounds, preferred is at least one compound selected from the group consisting of an ethyleneoxide adduct of acetylene glycol and an alkyleneoxide adduct of an alcohol.

As the ethyleneoxide adduct of acetylene glycol, preferred are those ethyleneoxide adducts whose average molar number of addition of EO is preferably not less than 5.0, more preferably not less than 6.0, even more preferably not less than 7.0 and further even more preferably not less than 8.0, and is also preferably not more than 40.0, more preferably not more than 38.0, even more preferably not more than 36.0, further even more preferably not more than 34.0 and still further even more preferably not more than 32.0.

The surfactant (B) may be produced by subjecting the acetylene glycol obtained by the same method as used for production of the surfactant (A) to addition reaction with ethyleneoxide such that the average molar number of addition of EO thereof is adjusted to a desired value.

Examples of commercially available products of the ethyleneoxide adduct of acetylene glycol as the surfactant (B) include "SURFYNOL 465" (9.7 mol (on the average) EO adduct of 2,4,7,9-tetramethyl-5-decyne-4,7-diol; HLB: 13.1) and "SURFYNOL 485" (33 mol (on the average) EO adduct of 2,4,7,9-tetramethyl-5-decyne-4,7-diol; HLB: 17.3) both available from Nissin Chemical Industry Co., Ltd., and Air Products & Chemicals, Inc., and "ACETYLENOL E81" (8.1 mol (on the average) EO adduct of 2,4,7,9-tetramethyl-5-decyne-4,7-diol; HLB: 13.0), "ACETYLENOL E100" (10 mol (on the average) EO adduct of 2,4,7,9-tetramethyl-5-decyne-4,7-diol; HLB: 13.9) and "ACETYLENOL E200" (20 mol (on the average) EO adduct of 2,4,7,9-tetramethyl-5-decyne-4,7-diol; HLB: 16.4) all available from Kawaken Fine Chemicals Co., Ltd., etc.

As the alkyleneoxide adduct of an alcohol, from the viewpoint of improving solubility of the component (A) in the water-based ink and suppressing occurrence of turbidity of the ink, preferred is an alkyleneoxide adduct of an alcohol having not less than 6 and not more than 30 carbon atoms.

From the same viewpoint as described above, the number of carbon atoms in the alcohol contained in the alkyleneoxide adduct of an alcohol is preferably not less than 8, more preferably not less than 10 and even more preferably not less than 12, and is also preferably not more than 24, more preferably not more than 22 and even more preferably not more than 20.

As the alkyleneoxide adduct, from the same viewpoint as described above, preferred are an ethyleneoxide adduct and an ethyleneoxide/propyleneoxide adduct, and more preferred is an ethyleneoxide adduct.

As the alkyleneoxide adduct of an alcohol, even more preferred is a compound represented by the following formula (2).

$$R^3O\text{-}[(EO)_m/(PO)_n]\text{---}H \qquad (2)$$

wherein $R^3$ is a hydrocarbon group having not less than 6 and not more than 30 carbon atoms; EO is an ethyleneoxy group; PO is a propyleneoxy group; m and n represent an average molar number of addition of ethyleneoxy groups and an average molar number of addition of propyleneoxy groups, respectively, m is a number of not less than 4 and not more than 100, n is a number of not less than 0 and not more than 50, and a sum of m and n is not less than 4 and not more than 120; and the mark "/" means that the bonding structure of EO and PO may be either a random structure or a block structure, and the order of addition of EO and PO is not limited.

The number of carbon atoms of the hydrocarbon group as $R^3$ is preferably not less than 8, more preferably not less than 10 and even more preferably not less than 12 from the viewpoint of improving solubility of the component (A) in the water-based ink and suppressing occurrence of turbidity of the ink, and is also preferably not more than 24, more preferably not more than 22, even more preferably not more than 20, further even more preferably not more than 18 and still further even more preferably not more than 14 from the viewpoint of improving ejection properties of the water-based ink and improving hiding power of the ink when printed on a low-water absorbing recording medium as well as from the viewpoint of improving storage stability of the ink.

From the same viewpoints as described above, the hydrocarbon group is preferably a linear or branched alkyl group or alkenyl group, and more preferably a linear alkyl group or alkenyl group.

Examples of the hydrocarbon group having not less than 6 and not more than 30 carbon atoms include n-hexyl, n-heptyl, n-octyl, 2-ethylhexyl, n-nonyl, n-decyl, 2-propylheptyl, lauryl, myristyl, palmityl, stearyl, oleyl, 2-octyldecyl and behenyl. Among these groups, preferred are lauryl, myristyl, palmityl, stearyl, oleyl, 2-octyldecyl and behenyl, and more preferred is lauryl.

The average molar number (m) of addition of ethyleneoxy groups is not less than 4 and not more than 100. More specifically, the average molar number (m) of addition of ethyleneoxy groups is preferably not less than 6, more preferably not less than 8 and even more preferably not less than 10 from the viewpoint of improving solubility of the component (A) in the water-based ink and suppressing occurrence of turbidity in the ink as well as from the viewpoint of improving storage stability of the ink, and is also preferably not more than 80, more preferably not more than 70, even more preferably not more than 60, further even more preferably not more than 50 and still further even more preferably not more than 30 from the viewpoint of improving ejection properties of the ink.

The average molar number (n) of addition of propyleneoxy groups is not less than 0 and not more than 50. More specifically, from the same viewpoint as described above, the average molar number (n) of addition of propyleneoxy groups is preferably not more than 40, more preferably not more than 30, even more preferably not more than 20, further even more preferably not more than 5 and still further even more preferably 0.

The sum of m and n is not less than 4 and not more than 120. More specifically, from the same viewpoint as described above, the sum of m and n is preferably not less than 6, more preferably not less than 8 and even more preferably not less than 10, and is also preferably not more than 80, more preferably not more than 70, even more preferably not more than 60, further even more preferably not more than 50 and still further even more preferably not more than 30.

When n is not less than 2, the compound represented by the formula (2) may be in the form of either a block copolymer or a random copolymer. When the compound is in the form of a block copolymer, the compound preferably includes an oxyethylene chain on a hydroxyl group side thereof, i.e., RO—(PO)(EO)—H.

In addition, when the compound is in the form of a block copolymer, the compound may include a tri-block structure represented by RO-(EO)(PO)(EO)—H.

Examples of commercially available products of the alkyleneoxide adduct of an alcohol include "EMULGEN 108" (HLB: 12.1; average molar number of addition of EO: 6), "EMULGEN 109P" (HLB: 13.6; average molar number of addition of EO: 8), "EMULGEN 120" (HLB: 15.3; average molar number of addition of EO: 13), "EMULGEN 147" (HLB: 16.3; average molar number of addition of EO: 17) and "EMULGEN 150" (HLB: 18.4; average molar number of addition of EO: 44) which are in the form of an ethyleneoxide adduct of lauryl alcohol, all available from Kao Corporation. Also, examples of commercially available products of the other alkyleneoxide adduct of an alcohol include "EMULGEN 707" (as an ethyleneoxide adduct of a secondary alcohol having 11 to 15 carbon atoms; HLB: 12.1; average molar number of addition of EO: 6) and "EMULGEN 220" (as an ethyleneoxide adduct of a linear primary alcohol having 16 to 18 carbon atoms; HLB: 14.2; average molar number of addition of EO: 13) both available from Kao Corporation.

The content of the component (B) in the water-based ink is preferably not less than 0.5% by mass, more preferably not less than 1.0% by mass, even more preferably not less than 1.5% by mass and further even more preferably not less than 1.8% by mass from the viewpoint of improving solubility of the component (A) in the water-based ink and suppressing occurrence of turbidity of the ink as well as from the viewpoint of suppressing image unevenness (MOTTLING) of printed characters or images when printed on a low-water absorbing recording medium and obtaining printed characters or images having excellent uniformity. Also, the content of the component (B) in the water-based ink is preferably not more than 9.0% by mass, more preferably not more than 6.0% by mass, even more preferably not more than 5.0% by mass, further even more preferably not more than 4.5% by mass and still further even more preferably not more than 3.0% by mass from the viewpoint of improving ejection properties of the water-based ink, suppressing image unevenness (MOTTLING) of printed characters or images when printed on a low-water absorbing recording medium and obtaining printed characters or images having excellent uniformity as well as from the viewpoint of improving storage stability of the ink.

[Total Content of Surfactants (A) and (B)]

The total content of the surfactants (A) and (B) in the water-based ink is preferably not less than 1.5% by mass, more preferably not less than 1.8% by mass and even more preferably not less than 2.0% by mass, and is also preferably not more than 9.0% by mass, more preferably not more than 6.0% by mass, even more preferably not more than 5.0% by mass and further even more preferably not more than 4.0% by mass, from the viewpoint of preventing foaming of the water-based ink and suppressing increase in viscosity of the ink to improve driving frequency responsivity thereof.

In the present invention, when producing the water-based ink of the present invention by compounding the surfactants (A) and (B) in the ink, the surfactants (A) and (B) may be previously mixed with each other to prepare a mixture thereof to be added to the ink. In this case, the amounts of the surfactants (A) and (B) compounded in the ink are equal to the contents of the surfactants (A) and (B) in the resulting water-based ink, respectively, and the mixture of the surfactants (A) and (B) is used as the surfactant for the water-based ink.

(Mass Ratio of [Surfactant (A)/Surfactant (B)])

The mass ratio of the surfactant (A) to the surfactant (B) [surfactant (A)/surfactant (B)] is preferably not less than 0.1, more preferably not less than 0.2 and even more preferably not less than 0.3, and is also preferably not more than 3.0, more preferably not more than 2.0 and even more preferably not more than 1.0, from the viewpoint of preventing foaming of the water-based ink and improving driving frequency responsivity thereof.

The water-based ink of the present invention may also contain other surfactants than the surfactants (A) and (B) unless the advantageous effects of the present invention are adversely affected.

The total content of the surfactants (A) and (B) and the other surfactants in the water-based ink is preferably not less than 1.5% by mass, more preferably not less than 1.8% by mass and even more preferably not less than 2.0% by mass, and is also preferably not more than 10.0% by mass, more preferably not more than 7.0% by mass, even more preferably not more than 5.5% by mass and further even more preferably not more than 4.0% by mass.

<Polyether-Modified Silicone (C)>

The polyether-modified silicone (C) used in the present invention has a kinematic viscosity of not less than 30 mm²/s and not more than 190 mm²/s as measured at 25° C.

The polyether-modified silicone (C) is used for the purposes of suppressing reduction in a dot size of droplets of the water-based ink during a drying step thereof after wet-spreading of the water-based ink over a recording medium as well as concentrating the surfactants on the surface of nozzles to thereby suppress drying of the water-based ink and improve ejection properties of the water-based ink. From the same viewpoint as described above, the kinematic viscosity of the polyether-modified silicone (C) as measured at 25° C. is preferably not less than 40 mm²/s, more preferably not less than 50 mm²/s and even more preferably not less than 60 mm²/s, and is also preferably not more than 185 mm²/s, more preferably not more than 180 mm²/s, even more preferably not more than 175 mm²/s, further even more preferably not more than 160 mm²/s and still further even more preferably not more than 140 mm²/s.

Meanwhile, the kinematic viscosity of the polyether-modified silicone (C) as measured at 25° C. may be measured by using an Ubbellohde viscometer.

The polyether-modified silicone (C) has such a structure that a hydrocarbon group bonded to a side chain and/or a terminal end of a silicone oil is substituted with a polyether group.

Examples of the suitable polyether group of the polyether-modified silicone (C) include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block manner or a random manner. More specifically, as the polyether-modified silicone (C), there may be used a compound formed by grafting a polyether group to a main chain of a silicone, a compound formed by bonding a silicone and a polyether group to each other in a block manner, etc.

Examples of the suitable polyether-modified silicone (C) include those compounds represented by the following general formula (3) or (4).

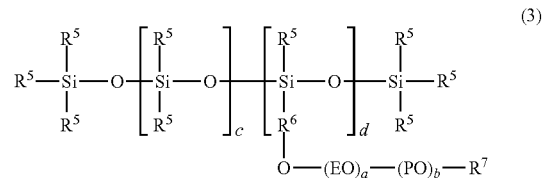

(3)

wherein R⁵ is an alkyl group having 1 to 3 carbon atoms or a hydroxy group; R⁶ is an alkanediyl group having 2 to 5 carbon atoms; R⁷ is a hydrogen atom, an alkyl group having 1 to 3 carbon atoms or a hydroxy group; EO is an ethyleneoxy group; PO is a propyleneoxy group (a trimethyleneoxy group or a propane-1,2-diyloxy group); a, b, c and d each represent an average molar number of addition of respective constitutional units in which a is a number of 1 to 50, b is a number of 0 to 10, c is a number of 1 to 500 and d is a number of 1 to 50; and a plurality of the R⁵ groups may be the same or different from each other.

In the general formula (3), a is preferably a number of 1 to 30 and more preferably 1 to 20; b is preferably a number of 0 to 5 and more preferably 0 to 3; c is preferably a number of 3 to 400 and more preferably 5 to 300; and d is preferably a number of 1 to 40 and more preferably 1 to 30. The constitutional units in the number of each of a, b, c and d may be the same or different from each other.

The average molar numbers a to d of addition of the respective constitutional units are preferably determined such that the kinematic viscosity of the compound represented by the general formula (3) as measured at 25° C. falls within the range of not less than 30 mm²/s and not more than 190 mm²/s.

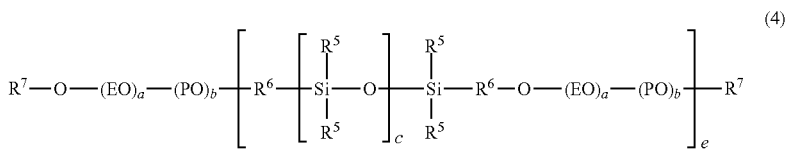

(4)

wherein $R^5$, $R^6$, $R^7$, EO, PO a, b and c are the same as those defined above; e represents an average molar number of addition of the constitutional unit, and is a number of 1 to 50; and a plurality of the $R^5$ groups, a plurality of the $R^6$ groups and a plurality of the $R^7$ groups may be respectively the same or different from each other.

In the general formula (4), a is preferably a number of 1 to 30 and more preferably 1 to 20; b is preferably a number of 0 to 5 and more preferably 0 to 3; c is preferably a number of 1 to 400 and more preferably 1 to 300; and e is preferably a number of 1 to 40 and more preferably 1 to 30. The constitutional units in the number of each of a, b, c and e may be the same or different from each other.

The average molar numbers a, b, c and e of addition of the respective constitutional units are preferably determined such that the kinematic viscosity of the compound represented by the general formula (4) as measured at 25° C. falls within the range of not less than 30 mm²/s and not more than 190 mm²/s.

Specific examples of the polyether-modified silicone (C) include KF series products available from Shin-Etsu Chemical Industry Co., Ltd., such as "KF-351" (kinematic viscosity at 25° C.: 70 mm²/s; hereinafter defined in the same way), "KF-355A" (kinematic viscosity: 150 mm²/s), "KF-642" (kinematic viscosity: 50 mm²/s), "KF-945" (kinematic viscosity: 130 mm²/s), "KF-6011" (kinematic viscosity: 130 mm²/s), "KF-6015" (kinematic viscosity: 130 mm²/s) and "KF-6204" (kinematic viscosity: 70 mm²/s); SILFACE SAG series products available from Nissin Chemical Industry Co., Ltd., such as "SILFACE SAG 005" (kinematic viscosity: 170 mm²/s) and "SILFACE SAG 503A" (kinematic viscosity: 80 mm²/s); and "FZ-2110" (kinematic viscosity: 128 mm²/s) and "FZ-2123" (kinematic viscosity: 90 mm²/s) (tradenames) both available from former Nippon Unicar Co., Ltd.

These polyether-modified silicones (C) are preferably used alone or in combination of any two or more thereof.

The content of the polyether-modified silicone (C) in the water-based ink is preferably not less than 0.01% by mass, more preferably not less than 0.02% by mass and even more preferably not less than 0.03% by mass, and is also preferably not more than 5% by mass, more preferably not more than 3% by mass, even more preferably not more than 1% by mass, further even more preferably not more than 0.8% by mass, still further even more preferably not more than 0.3% by mass, still further even more preferably not more than 0.2% by mass and still further even more preferably not more than 0.1% by mass.

The mass ratio of a sum of the surfactant (A) and the surfactant (B) to the polyether-modified silicone (C) {[(A)+(B)]/(C)} in the water-based ink is preferably not less than 0.5, more preferably not less than 1, even more preferably not less than 2.5, further even more preferably not less than 5, still further even more preferably not less than 10 and still further even more preferably not less than 20, and is also preferably not more than 400, more preferably not more than 300, even more preferably not more than 200, further even more preferably not more than 100 and still further even more preferably not more than 80, from the viewpoint of improving wet-spreadability of the water-based ink, suppressing reduction in a dot size of the ink during a drying step thereof when printed on a low-water absorbing recording medium and obtaining printed characters or images having excellent uniformity as well as from the viewpoint of preventing foaming of the water-based ink and improving driving frequency responsivity of the ink.

[Water-Insoluble Polymer Particles Q]

The water-based ink of the present invention preferably contains water-insoluble polymer particles from the viewpoint of improving fusing properties of printed characters or images when printed on a low-water absorbing recording medium. By incorporating the surfactant (A), the surfactant (B) and the polyether-modified silicone (C) into the water-based ink of the present invention, the water-insoluble polymer particles can be improved in dispersion stability in the water-based ink, so that the resulting ink is excellent in ejection properties. The water-insoluble polymer particles may be in the form of pigment-free water-insoluble polymer particles as one of preferred forms thereof. More specifically, the water-based ink used in the present invention preferably contains water-insoluble polymer particles Q (hereinafter also referred to merely as "polymer particles Q") from the viewpoint of improving fusing properties of printed characters or images when printed on a low-water absorbing recording medium.

The polymer particles Q preferably contain no colorant from the viewpoint of improving storage stability and ejection properties of the water-based ink. In the case where the pigment-containing polymer particles P are used as the pigment, the pigment-containing polymer particles P are preferably used in combination with the polymer particles Q from the viewpoint of improving storage stability and ejection properties of the water-based ink. In addition, the polymer particles Q are preferably used in the form of a dispersion containing the polymer particles Q from the viewpoint of enhancing productivity of the water-based ink.

The water-insoluble polymer particles Q used in the present invention are water-insoluble polymer particles incorporated into the water-based ink which contain a constitutional unit derived from a (meth)acrylic acid (q-1) and a constitutional unit derived from a (meth)acrylic acid ester (q-2), in which:

the glass transition temperature of the water-insoluble polymer particles is not lower than 10° C. and not higher than 90° C.;

the content of the constitutional unit derived from the (meth)acrylic acid (q-1) in whole constitutional units of the water-insoluble polymer particles is not less than 1.0% by mass and not more than 6.0% by mass; and the water-insoluble polymer particles are produced by increasing a molar ratio of the (meth)acrylic acid (q-1) to the (meth)acrylic acid ester (q-2) [(q-1)/(q-2)] which are introduced into the reaction system upon production of the water-insoluble polymer particles, at least one time in the course of the reaction.

Examples of the monomer capable of forming the constitutional unit derived from the (meth)acrylic acid (q-1) include acrylic acid and methacrylic acid. Of these compounds, preferred is methacrylic acid.

The content of the constitutional unit derived from the (meth)acrylic acid (q-1) in whole constitutional units of the polymer particles Q is not less than 1.0% by mass, preferably not less than 1.5% by mass, more preferably not less than 2.0% by mass and even more preferably not less than 1.8% by mass, and is also not more than 6.0% by mass, preferably not more than 5.8% by mass, even more not more than 5.5% by mass and further even more not more than 5.3% by mass, from the viewpoint of improving dispersion stability of the water-insoluble polymer particles Q and improving storage stability and ejection properties of the resulting ink.

Meanwhile, the contents of the respective constitutional units in the polymer particles Q may be calculated from the amounts of the monomers charged upon production of the polymer particles Q.

Examples of the monomer capable of forming the constitutional unit derived from the (meth)acrylic acid ester (q-2) include alkyl group-containing (meth)acrylic acid esters and aromatic group-containing (meth)acrylic acid esters.

The alkyl group-containing (meth)acrylic acid esters are preferably those (meth)acrylic acid esters containing an alkyl group having 1 to 22 carbon atoms. Specific examples of the alkyl group-containing (meth)acrylic acid esters include methyl (meth)acrylate, ethyl (meth)acrylate, (iso) propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" as used herein mean both the structure in which the groups expressed by "iso or tertiary" and "iso" respectively are present, and the structure in which these groups are not present (i.e., normal).

Also, specific examples of the aromatic group-containing (meth)acrylic acid esters include benzyl (meth)acrylate and phenoxyethyl (meth)acrylate.

Of these monomers capable of forming the constitutional unit derived from the (meth)acrylic acid ester (q-2), preferred are those (meth)acrylic acid esters containing an alkyl group preferably having 1 to 10 carbon atoms and more preferably 1 to 8 carbon atoms, and more preferred are methyl methacrylate and 2-ethylhexyl acrylate.

The content of the constitutional unit derived from the (meth)acrylic acid ester (q-2) in whole constitutional units of the polymer particles Q is preferably not less than 94.0% by mass and more preferably not less than 94.5% by mass, and is also not more than 99.0% by mass and more preferably not more than 98.0% by mass, from the viewpoint of improving fusing properties of a film of the ink after drying, suppressing reduction in a dot size of the ink during a drying step thereof and obtaining printed characters or images having excellent uniformity.

From the same viewpoint as described above, the total content of the constitutional unit derived from the (meth) acrylic acid (q-1) and the constitutional unit derived from the (meth)acrylic acid ester (q-2) in whole constitutional units of the polymer particles Q is preferably not less than 95.0% by mass, more preferably not less than 96.0% by mass and even more preferably not less than 98.0% by mass, and is also not more than 100.0% by mass.

Also, from the same viewpoint as described above, the mass ratio of the constitutional unit derived from the (meth) acrylic acid (q-1) to the constitutional unit derived from the (meth)acrylic acid ester (q-2) [(q-1)/(q-2)] in the polymer particles Q is preferably not less than 0.02, more preferably not less than 0.03 and even more preferably not less than 0.04, and is also preferably not more than 0.20, more preferably not more than 0.15 and even more preferably not more than 0.10.

The glass transition temperature of the polymer particles Q is preferably not lower than 10° C., more preferably not lower than 20° C., even more preferably not lower than 30° C., further even more preferably not lower than 40° C. and still further even more preferably not lower than 45° C., and is also preferably not higher than 90° C., more preferably not higher than 85° C., even more preferably not higher than 80° C. and further even more preferably not higher than 78° C., from the viewpoint of improving fusing properties of printed characters or images. The glass transition temperature of the polymer particles Q may be controlled to a desired value by adjusting the kinds or constitutional ratios of the monomers other than the (meth)acrylic acid (q-1), for example, the kinds or constitutional ratios of the monomer (q-2).

The polymer particles Q used in the present invention may be appropriately synthesized products, or may be commercially available products.

(Synthesis of Polymer Particles Q)

The polymer particles Q may be produced by copolymerizing a mixture of the (meth)acrylic acid (q-1) and the (meth)acrylic acid ester (q-2) by known polymerization methods. Examples of the preferred polymerization methods include an emulsion polymerization method and a suspension polymerization method, etc. Among these polymerization methods, more preferred is an emulsion polymerization method.

The polymerization may be carried out in the presence of a polymerization initiator. Examples of the polymerization initiator include persulfates and water-soluble azo polymerization initiators. Of these polymerization initiators, more preferred are persulfates such as ammonium persulfate and potassium persulfate.

Upon the polymerization, a surfactant may also be used. Examples of the surfactant include a nonionic surfactant, an anionic surfactant and a cationic surfactant. Of these surfactants, from the viewpoint of improving dispersion stability of the resin particles, preferred is a nonionic surfactant. Examples of the nonionic surfactant include polyoxyethylene alkyl ethers, polyoxyethylene alkyl aryl ethers, polyoxyethylene fatty acid esters, oxyethylene/oxypropylene block copolymers and the like. Of these nonionic surfactants, from the viewpoint of improving dispersion stability of the resin particles, preferred are polyoxyethylene alkyl ethers.

The preferred polymerization conditions may vary depending upon the kind of polymerization initiator used, etc. The polymerization temperature is preferably not lower than 50° C. and not higher than 90° C., and the polymerization time is preferably not shorter than 1 hour and not longer than 20 hours. Furthermore, the polymerization is preferably conducted in a nitrogen gas atmosphere or an atmosphere of an inert gas such as argon.

After completion of the polymerization reaction, the polymer thus produced may be isolated from the reaction solution by a known method such as reprecipitation and removal of the solvent by distillation. In addition, the thus obtained polymer may be further subjected to reprecipitation, membrane separation, chromatography, extraction, etc., for removing unreacted monomers, etc., therefrom.

The polymer particles Q are preferably used as such in the form of a polymer dispersion using water as a dispersing medium without removing the organic solvent used in the polymerization reaction therefrom from the viewpoint of well compounding the polymer particles in the ink.

The solid content of the dispersion of the polymer particles Q is preferably not less than 30% by mass and more preferably not less than 40% by mass, and is also preferably not more than 60% by mass and more preferably not more than 50% by mass, from the viewpoint of well compounding the polymer particles Q with the pigment-containing polymer particles P and the ink.

(Weight-Average Molecular Weight of Polymer Particles Q)

The weight-average molecular weight of the polymer particles Q used in the present invention is preferably not less than 100,000, more preferably not less than 200,000 and even more preferably not less than 500,000, and is also preferably not more than 2,500,000 and more preferably not more than 1,000,000, from the viewpoint of improving fusing properties of printed characters or images, suppressing reduction in a dot size of the ink during a drying step thereof when printed on a low-water absorbing recording medium and obtaining printed characters or images having excellent uniformity.

(Average Particle Size of Polymer Particles Q)

The average particle size of the polymer particles Q in the dispersion or water-based ink containing the polymer particles Q is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the water-based ink and enhancing optical density of the ink when printed on a low-water absorbing recording medium.

Meanwhile, the weight-average molecular weight and average particle size of the polymer particles Q may be measured by the methods described in Examples below.

(Commercially Available Products of Dispersion of Polymer Particles Q)

Examples of the commercially available products of the dispersion of the polymer particles Q include acrylic resin dispersions such as "Neocryl A1127" (anionic self-crosslinkable aqueous acrylic resin) available from DSM NeoResins, Inc., and "JONCRYL 390" available from BASF Japan, Ltd.; urethane resin dispersions such as "WBR-2018" and "WBR-2000U" both available from Taisei Fine Chemical Co., Ltd.; styrene-butadiene resin dispersions such as "SR-100" and "SR102" both available from Nippon A & L Inc.; styrene-acrylic resin dispersions such as "JONCRYL 7100", "JONCRYL 737" and "JONCRYL 538" all available from BASF Japan, Ltd.; and vinyl chloride-based resin dispersions such as "VINYBLAN 701" available from Nissin Chemical Industry Co., Ltd., etc.

The polymer particles Q may be used in the form of a dispersion prepared by dispersing the polymer particles Q in water, and the dispersion of the polymer particles Q may contain a dispersant such as a surfactant, if required. The dispersion of the polymer particles Q also acts as a fusing emulsion for fusing droplets of the ink ejected from ink-jet nozzles on a recording medium and suppressing reduction in a dot size of the ink during a drying step thereof to thereby obtain printed characters or images having excellent uniformity. The content of the polymer particles Q in the dispersion containing the polymer particles Q is preferably not less than 10% by mass, more preferably not less than 20% by mass and even more preferably not less than 30% by mass, and is also preferably not more than 70% by mass, more preferably not more than 60% by mass and even more preferably not more than 55% by mass, from the viewpoint of improving dispersion stability of the polymer particles Q and attaining good convenience upon formulation of the ink.

In the case of using the water-insoluble polymer particles Q, the content of the polymer particles Q in the water-based ink is not less than 1.0% by mass, preferably not less than 1.2% by mass, more preferably not less than 1.4% by mass, even more preferably not less than 1.6% by mass and further even more preferably not less than 1.8% by mass, and is also preferably not more than 4.0% by mass, more preferably not more than 3.8% by mass, even more preferably not more than 3.6% by mass, further even more preferably not more than 3.2% by mass and still further even more preferably not more than 3.0% by mass, from the viewpoint of improving fusing properties of printed characters or images, suppressing reduction in a dot size of the ink during a drying step thereof when printed on a low-water absorbing recording medium and obtaining printed characters or images having excellent uniformity.

The mass ratio of the pigment to the water-insoluble polymer particles Q [pigment/water-insoluble polymer particles Q] is preferably not less than 0.3, more preferably not less than 0.5 and even more preferably not less than 0.7, and is also preferably not more than 4.0, more preferably not more than 3.0 and even more preferably not more than 2.5 from the viewpoint of promoting drying of printed characters or images when printed on a low-water absorbing recording medium, suppressing reduction in a dot size of the ink during a drying step thereof, obtaining printed characters or images having excellent uniformity and enhancing optical density of printed characters or images, as well as from the viewpoint of improving fusing properties of printed characters or images on the surface of paper upon drying of the ink.

<Organic Solvent (D)>

The water-based ink of the present invention contains an organic solvent (D) from the viewpoint of improving uniformity of printed characters or images owing to spreading of dots of the ink when printed on a low-water absorbing recording medium.

The content of the organic solvent (D) in the water-based ink is preferably not less than 20% by mass, more preferably not less than 25% by mass and even more preferably not less than 28% by mass from the viewpoint of improving ejection properties of the ink, and is also preferably not more than 60% by mass, more preferably not more than 50% by mass and even more preferably not more than 45% by mass from the viewpoint of improving storage stability of the water-based ink as well as from the viewpoint of promoting drying of printed characters or images when printed on a low-water absorbing recording medium, suppressing reduction in a dot size of the ink during a drying step thereof and obtaining printed characters or images having excellent uniformity.

From the viewpoint of improving drying of printed characters or images when printed on a low-water absorbing recording medium, the organic solvent (D) is constituted of one or more organic solvents each having a boiling point of not lower than 90° C., and the weighted mean value of the boiling point of the organic solvent (D) which is weighted by contents (% by mass) of the respective organic solvents in the organic solvent (D) is not lower than 150° C. and not higher than 230° C. If two or more kinds of organic solvents are used in the organic solvent (D), there are preferably used a plurality of organic solvents that are different in boiling point from each other.

The weighted mean value of the boiling point of the organic solvent (D) is not lower than 150° C., preferably not lower than 160° C. and more preferably not lower than 180° C. from the viewpoint of preventing dry-out of the ink in ink-jet nozzles, and is also not higher than 230° C., preferably not higher than 225° C., more preferably not higher than 215° C., even more preferably not higher than 210° C. and further even more preferably not higher than 200° C. from the viewpoint of promoting drying of printed characters or images when printed on a low-water absorbing recording medium, suppressing reduction in a dot size of the ink during a drying step thereof and obtaining printed characters or images having excellent uniformity.

As the boiling point of an organic solvent is lowered, the saturated vapor pressure and the evaporation rate of the organic solvent as measured at a specific temperature are increased. In addition, as the content of the organic solvent having a high evaporation rate as measured at the specific temperature in the mixed organic solvent is increased, the evaporation rate of the mixed organic solvent as measured at the specific temperature is increased. Therefore, the weighted mean value of the boiling point of the organic solvent (D) is regarded as an index of the evaporation rate of the mixed organic solvent.

Examples of the compound used as the organic solvent (D) include polyhydric alcohols, polyhydric alcohol alkyl ethers, nitrogen-containing heterocyclic compounds, amides, amines and sulfur-containing compounds. Among these compounds, from the viewpoint of improving storage stability and ejection properties of the water-based ink, preferred is at least one compound selected from the group consisting of polyhydric alcohols and polyhydric alcohol alkyl ethers, and more preferred are polyhydric alcohols. The polyhydric alcohols may be in the form of a mixed alcohol containing a plurality of compounds belonging to the concept of polyhydric alcohols, and the polyhydric alcohol alkyl ethers may also be in the form of a mixed ether containing a plurality of compounds belonging to the concept of polyhydric alcohol alkyl ethers.

The content of the at least one compound selected from the group consisting of polyhydric alcohols and polyhydric alcohol alkyl ethers in the organic solvent (D) is preferably not less than 80% by mass, more preferably not less than 90% by mass, even more preferably not less than 95% by mass, further even more preferably substantially 100% by mass and still further even more preferably 100% by mass.

Examples of the polyhydric alcohols include ethylene glycol (boiling point (hereinafter also referred to merely as "b.p.") 197° C.), diethylene glycol (b.p. 244° C.), polyethylene glycol, propylene glycol (b.p. 188° C.), dipropylene glycol (b.p. 232° C.), polypropylene glycol, 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 1,6-hexanediol (b.p. 250° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.). Triethylene glycol (b.p. 285° C.), tripropylene glycol (b.p. 273° C.) and glycerin (b.p. 290° C.), etc., may also be used in combination with a compound having a boiling point lower than 250° C., preferably a compound having a boiling point lower than 230° C. Among these polyhydric alcohols, from the viewpoint of improving ejection properties of the ink as well as drying properties of the ink on the surface of paper when printed on a low-water absorbing recording medium, preferred are ethylene glycol, propylene glycol and diethylene glycol, and more preferred are ethylene glycol and propylene glycol.

Examples of the polyhydric alcohol alkyl ethers include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monoisopropyl ether (b.p. 207° C.), diethylene glycol monobutyl ether (b.p. 230° C.), triethylene glycol monomethyl ether (b.p. 122° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monobutyl ether (b.p. 227° C.), dipropylene glycol monomethyl ether (b.p. 90° C.), tripropylene glycol monomethyl ether (b.p. 100° C.) and tripropylene glycol monobutyl ether. Triethylene glycol monobutyl ether (b.p. 276° C.) or the like may also be used in combination with a compound having a boiling point lower than 250° C., preferably a compound having a boiling point lower than 230° C. Among these polyhydric alcohol alkyl ethers, from the viewpoint of improving ejection properties of the ink and suppressing reduction in a dot size of the ink during a drying step thereof when printed on a low-water absorbing recording medium as well as obtaining printed characters or images having excellent uniformity, preferred are diethylene glycol monoisopropyl ether and dipropylene glycol monomethyl ether, and more preferred is diethylene glycol monoisopropyl ether.

Examples of the nitrogen-containing heterocyclic compounds include N-methyl-2-pyrrolidone (b.p. 202° C.), 2-pyrrolidone (b.p. 245° C.), 1,3-dimethyl imidazolidinone (b.p. 220° C.) and ε-caprolactam (b.p. 136° C.).

Examples of the amides include formamide (b.p. 210° C.), N-methyl formamide (b.p. 199° C.) and N,N-dimethyl formamide (b.p. 153° C.).

Examples of the amines include monoethanolamine (b.p. 170° C.), diethanolamine (b.p. 217° C.), triethanolamine (b.p. 208° C.) and triethylamine (b.p. 90° C.).

Examples of the sulfur-containing compounds include dimethyl sulfoxide (b.p. 189° C.), etc. In addition, sulfolane (b.p. 285° C.) and thiodiglycol (b.p. 282° C.) and the like may also be used in combination with a compound having a boiling point lower than 250° C., preferably a compound having a boiling point lower than 230° C.

Among these compounds, from the viewpoint of improving ejection properties of the ink as well as drying properties of the ink on the surface of paper when printed on a low-water absorbing recording medium, preferred is at least one compound selected from the group consisting of ethylene glycol, propylene glycol and diethylene glycol monoisopropyl ether, and more preferred is at least one compound selected from the group consisting of ethylene glycol and propylene glycol.

The total content of ethylene glycol, propylene glycol and diethylene glycol monoisopropyl ether in the water-based ink is preferably not less than 15% by mass, more preferably not less than 20% by mass and even more preferably not less than 23% by mass from the viewpoint of improving ejection properties of the ink as well as drying properties of the ink on the surface of paper when printed on a low-water absorbing recording medium, and is also preferably not more than 55% by mass, more preferably not more than 45% by mass and even more preferably not more than 40% by mass from the same viewpoint as described above.

In addition, from the viewpoint of improving ejection properties of the ink as well as drying properties of the ink on the surface of paper when printed on a low-water absorbing recording medium, preferred are a combination of two or more kinds of polyhydric alcohols, a combination of two or more kinds of polyhydric alcohol alkyl ethers and a combination of at least one polyhydric alcohol and at least one polyhydric alcohol alkyl ether; more preferred are a combination of two or more kinds of polyhydric alcohols and a combination of at least one polyhydric alcohol and at least one polyhydric alcohol alkyl ether; even more preferred is a combination of two or more kinds of polyhydric alcohols; and further even more preferred is a combination of propylene glycol and diethylene glycol.

The total content of propylene glycol and diethylene glycol in the water-based ink is preferably not less than 15% by mass, more preferably not less than 20% by mass and even more preferably not less than 23% by mass from the viewpoint of improving ejection properties of the ink as well as drying properties of the ink on the surface of paper when printed on a low-water absorbing recording medium, and is also preferably not more than 55% by mass, more preferably not more than 45% by mass and even more preferably not more than 40% by mass from the same viewpoints as described above.

The content of propylene glycol in the water-based ink is preferably not less than 10% by mass, more preferably not less than 13% by mass and even more preferably not less than 17% by mass, and is also preferably not more than 55% by mass, more preferably not more than 45% by mass and even more preferably not more than 40% by mass, from the same viewpoints as described above.

<Other Components>

The water-based ink of the present invention may also contain various ordinary additives such as a wetting agent, a penetrant, a dispersant, a surfactant, a viscosity controller, a defoaming agent, an antiseptic agent, a mildew-proof agent and a rust preventive.

[Process for Producing Water-Based Ink]

The water-based ink of the present invention may be produced by mixing the pigment water dispersion, the nonionic surfactant (A), the nonionic surfactant (B), the polyether-modified silicone (C), the organic solvent (D) and water, if required, together with the polymer particles Q, etc., with each other while stirring.

(Content of Water)

The content of water in the water-based ink is preferably not less than 20% by mass, more preferably not less than 30% by mass and even more preferably not less than 40% by mass from the viewpoint of enhancing optical density, ejection properties, etc., of the water-based ink when printed on a low-water absorbing recording medium as well as from the viewpoint of improving storage stability of the water-based ink, and is also preferably not more than 75% by mass from the viewpoint of improving ejection properties of the ink. In the case where the other components than the pigment, the polymer particles Q, the organic solvent (D) and water are incorporated into the ink, the other components may be incorporated into the ink by substituting a part of the content of water in the ink therewith.

[Properties of Ink]

The viscosity of the water-based ink as measured at 32° C. is preferably not less than 2.0 mPa·s, more preferably not less than 3.0 mPa·s and even more preferably not less than 5.0 mPa·s from the viewpoint of improving ejection properties of the water-based ink, and is also preferably not more than 12 mPa·s, more preferably not more than 9.0 mPa·s and even more preferably not more than 7.0 mPa·s from the viewpoint of improving storage stability and ejection properties of the water-based ink.

The pH value of the water-based ink is preferably not less than 7.0, more preferably not less than 8.0 and even more preferably not less than 8.5 from the viewpoint of improving storage stability and ejection properties of the water-based ink as well as from the viewpoint of attaining excellent spreading of a dot size of the ink and enhancing optical density and rub fastness of the ink when printed on a low-water absorbing recording medium, and is also preferably not more than 11.0, more preferably not more than 10.0 and even more preferably 9.5 from the viewpoint of improving the resistance of members to the ink and suppressing skin irritation.

[Ink-Jet Printing Method]

The ink-jet printing method according to the present invention includes the step of printing characters or images on a recording medium using the water-based ink produced above, in which the recording medium has a water absorption of not less than 0 $g/m^2$ and not more than 10 $g/m^2$ as measured in a pure water contact time of 100 milliseconds.

The ink-jet printer suitably used in the ink-jet printing method of the present invention may be of either a thermal type or a piezoelectric type. In the present invention, a piezoelectric type ink-jet printer is preferably used.

The water absorption of the recording medium used in the present invention as measured under the condition that a contact time between the recording medium and pure water is 100 milliseconds is not less than 0 $g/m^2$ and not more than 10 $g/m^2$ and preferably not less than 0 $g/m^2$ and not more than 6 $g/m^2$.

Meanwhile, the water absorption of the recording medium may be measured by the method described in Examples below.

Examples of the recording medium used in the present invention include a low-water absorbing coated paper or a film.

Examples of the coated paper include a general-purpose glossy paper "OK Topcoat+" (available from Oji Paper Co., Ltd.; basis weight: 104.7 $g/m^2$; water absorption as measured in a contact time of 100 ms (hereinafter defined in the same way): 4.9 $g/m^2$), a multi-color foam glossy paper (available from Oji Paper Co., Ltd.; 104.7 $g/m^2$; water absorption: 5.2 $g/m^2$), "UPM Finesse Gloss" (available from UPM; 115 $g/m^2$; water absorption: 3.1 $g/m^2$), "UPM Finesse Matt" (available from UPM; 115 $g/m^2$; water absorption: 4.4 $g/m^2$), "TerraPress Silk" (available from Stora Enso; 80 $g/m^2$; water absorption: 4.1 $g/m^2$), and "LumiArt" (available from Stora Enso; 90 $g/m^2$), etc.

Examples of the film include a polyester film, a vinyl chloride film, a polypropylene film, a polyethylene film and a nylon film. These films may be subjected to surface treatments such as corona treatment, etc., if required.

Examples of the generally available films include "LUMIRROR T60" (available from Toray Industries Inc.; polyethylene terephthalate; thickness: 125 μm; water absorption: 2.3 $g/m^2$), "PVC80B P" (available from Lintec Corp.; polyvinyl chloride; water absorption: 1.4 $g/m^2$), "KINATH KEE 70CA" (available from Lintec Corp.; polyethylene), "YUPO SG90 PAT1" (available from Lintec Corp.; polypropylene), and "BONYL RX" (available from Kohjin Film & Chemical Co., Ltd.; nylon).

With respect to the aforementioned embodiments, the present invention further provides the following aspects relating to the water-based ink and the ink-jet printing method.

<1> A water-based ink including a pigment, a water-insoluble polymer, an acetylene glycol-based nonionic surfactant (A) having HLB of not less than 0 and not more than 5, a nonionic surfactant (B) having HLB of not less than 6 and not more than 20, a polyether-modified silicone (C) having a kinematic viscosity of not less than 30 mm$^2$/s and not more than 190 mm$^2$/s as measured at 25° C. and an organic solvent (D), in which a weighted mean value of a boiling point of the organic solvent (D) is not lower than 150° C. and not higher than 230° C.

<2> The water-based ink according to the aspect <1>, wherein a content of the pigment in the water-based ink is preferably not less than 1% by mass, more preferably not less than 2% by mass and even more preferably not less than 3% by mass, and is also preferably not more than 15% by mass, more preferably not more than 10% by mass and even more preferably not more than 6% by mass.

<3> The water-based ink according to the aspect <1> or <2>, wherein the pigment and the water-insoluble polymer p are present in the form of pigment-containing water-insoluble polymer particles P.

<4> The water-based ink according to any one of the aspects <1> to <3>, wherein the water-insoluble polymer p is a vinyl-based polymer that contains at least one constitutional unit selected from the group consisting of a constitutional unit derived from an ionic monomer (p-1), a constitutional unit derived from an aromatic ring-containing hydrophobic monomer (p-2) and a constitutional unit derived from a hydrophilic nonionic monomer (p-3) represented by the aforementioned formula (1).

<5> The water-based ink according to the aspect <4>, wherein a content of the constitutional unit derived from the ionic monomer (p-1) in the water-insoluble polymer p is preferably not less than 3% by mass, more preferably not less than 5% by mass, even more preferably not less than 8% by mass and further even more preferably not less than 10% by mass, and is also preferably not more than 40% by mass, more preferably not more than 30% by mass, even more preferably not more than 25% by mass and further even more preferably not more than 20% by mass.

<6> The water-based ink according to the aspect <4> or <5>, wherein a content of the constitutional unit derived from the aromatic ring-containing hydrophobic monomer (p-2) in the water-insoluble polymer p is preferably not less than 15% by mass, more preferably not less than 30% by mass, even more preferably not less than 37% by mass and further even more preferably not less than 45% by mass, and is also preferably not more than 84% by mass, more preferably not more than 80% by mass, even more preferably not more than 74% by mass and further even more preferably not more than 70% by mass.

<7> The water-based ink according to any one of the aspects <4> to <6>, wherein a content of a constitutional unit derived from a styrene-based macromonomer in the water-insoluble polymer p is preferably not less than 5% by mass, more preferably not less than 15% by mass and even more preferably not less than not less than 20% by mass, and is also preferably not more than 40% by mass, more preferably not more than 35% by mass and even more preferably not more than 30% by mass.

<8> The water-based ink according to any one of the aspects <4> to <7>, wherein a content of the constitutional unit derived from the hydrophilic nonionic monomer (p-3) in the water-insoluble polymer p is preferably not less than 13% by mass, more preferably not less than 15% by mass, even more preferably not less than 18% by mass and further even more preferably not less than 20% by mass, and is also preferably not more than 45% by mass, more preferably not more than 40% by mass, even more preferably not more than 38% by mass and further even more preferably not more than 35% by mass.

<9> The water-based ink according to any one of the aspects <4> to <8>, wherein the water-insoluble polymer p contains the monomers (p-1), (p-2) and (p-3), and a mass ratio of the component (p-1) to a sum of the component (p-2) and the component (p-3) {component (p-1)/[component (p-2)+component (p-3)]} is preferably not less than 0.03, more preferably not less than 0.05 and even more preferably not less than 0.10, and is also preferably not more than 0.50, more preferably not more than 0.40 and even more preferably not more than 0.30.

<10> The water-based ink according to any one of the aspects <3> to <9>, wherein a content of the pigment-containing polymer particles P in the water-based ink is preferably not less than 1.4% by mass, more preferably not less than 2.8% by mass and even more preferably not less than 4.2% by mass, and is also preferably not more than 21% by mass, more preferably not more than 14% by mass and even more preferably not more than 8.4% by mass.

<11> The water-based ink according to any one of the aspects <3> to <10>, wherein a content of the water-insoluble polymer p in the water-based ink is preferably not less than 0.4% by mass, more preferably not less than 0.8% by mass and even more preferably not less than 1.2% by mass, and is also preferably not more than 6% by mass, more preferably not more than 4% by mass and even more preferably not more than 2.4% by mass.

<12> The water-based ink according to any one of the aspects <1> to <11>, wherein HLB of the surfactant (A) is preferably not more than 5.0, more preferably not more than 4.9 and even more preferably not more than 4.8, and is also preferably not less than 2.0, more preferably not less than 2.5 and even more preferably not less than 2.8.

<13> The water-based ink according to any one of the aspects <1> to <12>, wherein an average molar number of addition of ethyleneoxide of the surfactant (A) is preferably not less than 0, and is also preferably not more than 3.0, more preferably not more than 2.5, even more preferably not more than 2.0 and further even more preferably not more than 1.5.

<14> The water-based ink according to any one of the aspects <1> to <13>, wherein the surfactant (A) is an acetylene glycol having an average molar number of addition of ethyleneoxide of not less than 0 and not more than 3.0.

<15> The water-based ink according to any one of the aspects <1> to <14>, wherein the surfactant (A) is at least one compound selected from the group consisting of one or more acetylene glycols selected from the group consisting of 2,4,7,9-tetramethyl-5-decyne-4,7-diol, 3,6-dimethyl-4-octyne-3,6-diol and 2,5-dimethyl-3-hexyne-2,5-diol, and ethyleneoxide adducts of these acetylene glycols, preferably at least one compound selected from the group consisting of 2,4,7,9-tetramethyl-5-decyne-4,7-diol and an ethyleneoxide adduct of 2,4,7,9-tetramethyl-5-decyne-4,7-diol, and more preferably 2,4,7,9-tetramethyl-5-decyne-4,7-diol.

<16> The water-based ink according to any one of the aspects <1> to <15>, wherein a content of the surfactant (A) in the water-based ink is preferably not less than 0.4% by mass, more preferably not less than 0.6% by mass and even more preferably not less than 0.8% by mass, and is also preferably not more than 4.0% by mass, more preferably not more than 3.0% by mass, even more preferably not more than 2.8% by mass and further even more preferably not more than 2.0% by mass.

<17> The water-based ink according to any one of the aspects <1> to <16>, wherein HLB of the surfactant (B) is preferably not less than 8, more preferably not less than 10, even more preferably not less than 12 and further even more preferably not less than 13, and is also preferably not more than 19, more preferably not more than 18.5, even more preferably not more than 17.5, further even more preferably not more than 17, still further even more preferably not more than 16.5 and still further even more preferably not more than 16.

<18> The water-based ink according to any one of the aspects <1> to <17>, wherein the surfactant (B) is at least one compound selected from the group consisting of an ethyleneoxide adduct of acetylene glycol, an alkyleneoxide adduct of an alcohol and a fatty acid alkanol amide, and preferably at least one compound selected from the group consisting of an ethyleneoxide adduct of acetylene glycol and an alkyleneoxide adduct of an alcohol.

<19> The water-based ink according to any one of the aspects <1> to <18>, wherein the surfactant (B) is at least one compound selected from the group consisting of an ethyleneoxide adduct of acetylene glycol having an average molar number of addition of ethyleneoxide of not less than 5.0 and not more than 40.0 and an alkyleneoxide adduct of an alcohol having not less than 6 and not more than 30 carbon atoms.

<20> The water-based ink according to any one of the aspects <1> to <19>, wherein the surfactant (B) is an ethyleneoxide adduct of acetylene glycol having an average molar number of addition of ethyleneoxide of preferably not less than 5.0, more preferably not less than 6.0, even more preferably not less than 7.0 and further even more preferably not less than 8.0, and is also preferably not more than 40.0, more preferably not more than 38.0, even more preferably not more than 36.0, further even more preferably not more than 34.0 and still further even more preferably not more than 32.0.

<21> The water-based ink according to any one of the aspects <1> to <20>, wherein the surfactant (B) is an alkyleneoxide adduct of an alcohol having not less than 6 carbon atoms, preferably not less than 8 carbon atoms, more preferably not less than 10 carbon atoms and even more preferably not less than 12 carbon atoms, and also having not more than 30 carbon atoms, preferably not more than 24 carbon atoms, more preferably not more than 22 carbon atoms and even more preferably not more than 20 carbon atoms.

<22> The water-based ink according to any one of the aspects <1> to <21>, wherein a content of the surfactant (B) in the water-based ink is preferably not less than 0.5% by mass, more preferably not less than 1.0% by mass, even more preferably not less than 1.5% by mass and further even more preferably not less than 1.8% by mass, and is also preferably not more than 9.0% by mass, more preferably not more than 6.0% by mass, even more preferably not more than 5.0% by mass, further even more preferably not more than 4.5% by mass and still further even more preferably not more than 3.0% by mass.

<23> The water-based ink according to any one of the aspects <1> to <22>, wherein a total content of the surfactants (A) and (B) in the water-based ink is preferably not less than 1.5% by mass, more preferably not less than 1.8% by mass and even more preferably not less than 2.0% by mass, and is also preferably not more than 9.0% by mass, more preferably not more than 6.0% by mass, even more preferably not more than 5.0% by mass and further even more preferably not more than 4.0% by mass.

<24> The water-based ink according to any one of the aspects <1> to <23>, wherein a mass ratio of the surfactant (A) to the surfactant (B) [surfactant (A)/surfactant (B)] is preferably not less than 0.1, more preferably not less than 0.2 and even more preferably not less than 0.3, and is also preferably not more than 3.0, more preferably not more than 2.0 and even more preferably not more than 1.0.

<25> The water-based ink according to any one of the aspects <1> to <24>, wherein a total content of the surfactant (A), the surfactant (B) and the other surfactants in the water-based ink is preferably not less than 1.5% by mass, more preferably not less than 1.8% by mass and even more preferably not less than 2.0% by mass, and is also preferably not more than 10.0% by mass, more preferably not more than 7.0% by mass, even more preferably not more than 5.5% by mass and further even more preferably not more than 4.0% by mass.

<26> The water-based ink according to any one of the aspects <1> to <25>, wherein a kinematic viscosity of the polyether-modified silicone (C) as measured at 25° C. is preferably not less than 40 mm$^2$/s, more preferably not less than 50 mm$^2$/s and even more preferably not less than 60 mm$^2$/s, and is also preferably not more than 185 mm$^2$/s, more preferably not more than 180 mm$^2$/s, even more preferably not more than 175 mm$^2$/s, further even more preferably not more than 160 mm$^2$/s and still further even more preferably not more than 140 mm$^2$/s.

<27> The water-based ink according to any one of the aspects <1> to <26>, wherein a content of the polyether-modified silicone (C) in the water-based ink is preferably not less than 0.01% by mass, more preferably not less than 0.02% by mass and even more preferably not less than 0.03% by mass, and is also preferably not more than 5% by mass, more preferably not more than 3% by mass, even more preferably not more than 1% by mass, further even more preferably not more than 0.8% by mass, still further even more preferably not more than 0.3% by mass, still further even more preferably not more than 0.2% by mass and still further even more preferably not more than 0.1% by mass.

<28> The water-based ink according to any one of the aspects <1> to <27>, wherein a mass ratio of a sum of the surfactant (A) and the surfactant (B) to the polyether-modified silicone (C) $\{[(A)+(B)]/(C)\}$ in the water-based ink is preferably not less than 0.5, more preferably not less than 1, more preferably not less than 2.5, even more preferably not less than 5, further even more preferably not less than 10 and still further even more preferably not less than 20, and is also preferably not more than 400, more preferably not more than 300, even more preferably not more than 200, further even more preferably not more than 100 and still further even more preferably not more than 80.

<29> The water-based ink according to any one of the aspects <1> to <28>, further including water-insoluble polymer particles.

<30> The water-based ink according to any one of the aspects <1> to <29>, wherein a weighted mean value of a boiling point of the organic solvent (D) is preferably not lower than 160° C. and more preferably not lower than 180° C., and is also preferably not higher than 225° C., more preferably not higher than 215° C., even more preferably not higher than 210° C. and further even more preferably not higher than 200° C.

<31> The water-based ink according to any one of the aspects <1> to <30>, wherein the organic solvent (D) preferably contains at least one compound selected from the group consisting of ethylene glycol, propylene glycol and diethylene glycol monoisopropyl ether, and more preferably at least one compound selected from the group consisting of ethylene glycol and propylene glycol.

<32> The water-based ink according to the aspect <30>, wherein a total content of ethylene glycol, propylene glycol and diethylene glycol monoisopropyl ether in the water-based ink is preferably not less than 15% by mass, more preferably not less than 20% by mass and even more preferably not less than 23% by mass, and is also preferably not more than 55% by mass, more preferably not more than 45% by mass and even more preferably not more than 40% by mass.

<33> The water-based ink according to any one of the aspects <1> to <32>, wherein a content of propylene glycol as the organic solvent (D) in the water-based ink is not less than 10% by mass, preferably not less than 13% by mass and more preferably not less than 17% by mass, and is also preferably not more than 55% by mass, more preferably not more than 45% by mass and even more preferably not more than 40% by mass.

<34> A use of the water-based ink according to any one of the aspects <1> to

<33>, as a water-based ink for ink-jet printing.

<35> An ink-jet printing method including the step of printing characters or images on a recording medium using the water-based ink according to any one of the aspects <1> to <33>, in which the recording medium has a water absorption of not less than 0 g/m$^2$ and not more than 10 g/m$^2$ and preferably not less than 0 g/m$^2$ and not more than 6 g/m$^2$ as measured in a pure water contact time of 100 milliseconds.

EXAMPLES

In the following Production Examples, Examples and Comparative Examples, the "part(s)" and "%" indicate "part(s) by mass" and "% by mass", respectively, unless otherwise specified. Meanwhile, the weight-average molecular weight of the water-insoluble polymer, the average particle size of the pigment-containing polymer particles, the solid content of the pigment water dispersion and the water absorption of the recording medium were measured by the following methods.

(1) Measurement of Weight-Average Molecular Weight of Water-Insoluble Polymer

The weight-average molecular weight of the water-insoluble polymer was measured by gel permeation chromatography [GPC apparatus: "HLC-8120GPC" available from Tosoh Corp.; column: "TSK-GEL α-M"×2 available from Tosoh Corp.; flow rate; 1 mL/min)] using N,N-dimethyl formamide in which phosphoric acid and lithium bromide were dissolved in amounts of 60 mmol/L and 50 mmol/L, respectively, as an eluent, and using a monodisperse polystyrene having a previously known molecular weight as a reference standard substance.

(2) Measurement of Average Particle Sizes of Pigment-Containing Polymer Particles P and Polymer Particles Q The particles were subjected to cumulant analysis using a laser particle analyzing system "ELS-8000" available from Otsuka Electrics Co., Ltd., to measure an average particle size thereof. The measurement was conducted at a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting the concentration of the dispersion to be measured to 5×10$^{-3}$% by mass in terms of the solid content thereof.

(3) Measurement of Solid Content of Pigment Water Dispersion

Ten grams (10.0 g) of sodium sulfate dried to constant weight in a desiccator were weighed and charged in a 30 mL polypropylene vessel (φ; 40 mm; height; 30 mm), and about 1.0 g of a sample was added to the vessel. The contents of the vessel were mixed and then accurately weighed. The resulting mixture was held in the vessel at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Water Absorption of Recording Medium as Measured in Pure Water Contact Time of 100 Milliseconds Using an automatic scanning liquid absorptiometer "KM500win" available from Kumagai Riki Kogyo Co., Ltd., the amount of pure water transferred to a recording medium when contacting the recording medium with pure water for 100 milliseconds was measured at 23° C. and a relative humidity of 50%. The thus measured amount of pure water transferred to the recording medium was determined as a water absorption of the recording medium as measured in a pure water contact time of 100 milliseconds. The measuring conditions are as follows.

"Spiral Method"
Contact time: 0.010-1.0 (sec)
Pitch (mm): 7
Length Per Sampling (degree): 86.29
Start Radius (mm): 20; End Radius (mm): 60
Min Contact Time (ms): 10; Max Contact Time (ms): 1000
Sampling Pattern (1-50): 50
Number of Sampling Points (>0): 19

"Square Head"
Split Span (mm): 1; Split Width (mm): 5

Production Example 1 (Production of Water-Insoluble Polymer p Solution)

The monomers, the solvent (methyl ethyl ketone) and the chain transfer agent (2-mercaptoethanol) as shown in the column "Initially Charged Monomer Solution" in Table 1 were charged into a reaction vessel equipped with two dropping funnels 1 and 2 and mixed with each other, and an inside atmosphere of the reaction vessel was replaced with a nitrogen gas, thereby obtaining an initially charged monomer solution.

On the other hand, the monomers, the solvent, the polymerization initiator "V-65" (tradename) (2,2'-azobis(2,4-dimethylvaleronitrile) available from Wako Pure Chemical Industries, Ltd., and the chain transfer agent as shown in the column "Dropping Monomer Solution 1" in Table 1 were mixed with each other to obtain a dropping monomer solution 1. The resulting dropping monomer solution 1 was charged into the dropping funnel 1, and an inside atmosphere of the dropping funnel 1 was replaced with a nitrogen gas.

In addition, the monomers, the solvent, the polymerization initiator and the chain transfer agent as shown in the column "Dropping Monomer Solution 2" in Table 1 were mixed with each other to obtain a dropping monomer solution 2. The resulting dropping monomer solution 2 was charged into the dropping funnel 2, and an inside atmosphere of the dropping funnel 2 was replaced with a nitrogen gas.

In a nitrogen atmosphere, the initially charged monomer solution in the reaction vessel was held at 77° C. while stirring, and the dropping monomer solution 1 in the dropping funnel 1 was gradually added dropwise to the reaction vessel over 3 hours. Next, the dropping monomer solution 2 in the dropping funnel 2 was gradually added dropwise to the reaction vessel over 2 hours. After completion of the dropwise addition, the resulting mixed solution in the reaction vessel was stirred at 77° C. for 0.5 hour.

Then, a polymerization initiator solution prepared by dissolving 0.6 part of the aforementioned polymerization initiator "V-65" in 27.0 parts of methyl ethyl ketone was added to the mixed solution, and the resulting reaction solution was aged at 77° C. for 1 hour while stirring. The aforementioned procedure including the preparation and addition of the polymerization initiator and the aging of the reaction solution was repeated five more times. Then, after maintaining the reaction solution in the reaction vessel at 80° C. for 1 hour, methyl ethyl ketone was added thereto, thereby obtaining a water-insoluble polymer p solution (solid content: 40.8%).

The weight-average molecular weights of the thus obtained water-insoluble polymer p was 52,700. In addition, the resulting water-insoluble polymer p was dried to constant weight at 105° C. for 2 hours and then dissolved in water such that the obtained solution had a concentration of $5 \times 10^{-3}\%$ by mass (in terms of a solid content thereof) to measure an average particle size of the water-insoluble polymer p. As a result, the water-insoluble polymer p had an average particle size of 89 nm.

Meanwhile, the details of the monomers as shown in Table 1 are as follows.

Styrene macromer: "AS-6(S)" available from Toagosei Co., Ltd.; concentration of active ingredients: 50% by mass; number-average molecular weight: 6000

M-40G: Methoxy polyethylene glycol monomethacrylate; "NK ESTER M-40G" available from Shin-Nakamura Chemical Co., Ltd.; average molar number of addition of ethyleneoxide: 4; end group: methoxy group

TABLE 1

|  | Initially charged monomer solution (part(s)) | Dropping monomer solution 1 (part(s)) | Dropping monomer solution 2 (part(s)) |
| --- | --- | --- | --- |
| Ionic monomer (p-1) | | | |
| Methacrylic acid | — | 51.2 | 12.8 |
| Hydrophobic monomer (p-2) | | | |
| Styrene | 17.6 | 140.8 | 17.6 |
| Styrene macromer | 12.0 | 108.0 | — |
| Hydrophilic monomer (p-3) | | | |
| "NK ESTER M-40G" | 10.0 | 80.0 | 10.0 |

TABLE 1-continued

|  | Initially charged monomer solution (part(s)) | Dropping monomer solution 1 (part(s)) | Dropping monomer solution 2 (part(s)) |
| --- | --- | --- | --- |
| Solvent | | | |
| Methyl ethyl ketone | 6.0 | 66.0 | 48.0 |
| Polymerization initiator | | | |
| V-65 | — | 3.2 | 0.8 |
| Chain transfer agent | | | |
| 2-Mercaptoethanol | 0.08 | 0.56 | 0.16 |

Production Example 2 (Production of Water Dispersion of Carbon Black-Containing Water-Insoluble Polymer Particles)

(1) The water-insoluble polymer p solution (solid content: 40.8%) obtained in Production Example 1 was weighed in an amount of 157.6 g and mixed with 60.4 g of methyl ethyl ketone (MEK), thereby obtaining an MEK solution of the water-insoluble polymer p. The resulting MEK solution of the water-insoluble polymer p was charged into a 2 L-capacity disper, and while stirring the solution at 1400 rpm, 448.3 g of ion-exchanged water, 19.5 g of a 5N sodium hydroxide aqueous solution and 1.5 g of a 25% ammonia aqueous solution were added thereto such that the degree of neutralization of the water-insoluble polymer by sodium hydroxide was adjusted to 85% and the degree of neutralization of the water-insoluble polymer by ammonia was adjusted to 40%. The resulting reaction solution was stirred at 1400 rpm for 15 minutes while cooling the solution in a water bath at 0° C. Then, 150 g of carbon black "MONARCH 717" available from Cabot Corp., as a pigment was added to the reaction solution, and the resulting mixture was stirred at 7000 rpm for 3 hours. The obtained pigment mixture was subjected to dispersion treatment under a pressure of 150 MPa by passing through a Microfluidizer "M-110EH-30XP" available from Microfluidics Corporation 20 times, thereby obtaining a dispersion treatment product. The resulting dispersion treatment product had a solid content of 21.0% by mass.

(2) A 2 L egg-plant shaped flask was charged with 1000 g of the dispersion treatment product obtained in the above step, and then 400 g of ion-exchanged water was added thereto (solid content: 15.0% by mass), and the resulting mixture was held under a pressure of 0.09 MPa in a warm water bath adjusted at 32° C. for 3 hours using a rotary distillation apparatus "Rotary Evaporator N-1000S" available from Tokyo Rikakikai Co., Ltd., operated at a rotating speed of 50 rpm to thereby remove the organic solvent therefrom. Furthermore, the temperature of the warm water bath was adjusted to 62° C., and the pressure was reduced to 0.07 MPa, and the reaction solution was concentrated under this condition until reaching a solid content of 25.0% by mass.

(3) The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 minutes. Thereafter, the resulting liquid layer portion was subjected to filtration through a 5 μm membrane filter "Minisart" available from Sartorius Inc.

Then, 44.56 g of ion-exchanged water was added to 400 g of the resulting filtrate (carbon black: 68.6 g; water-insoluble polymer p: 29.4 g). In addition, 0.89 g of "Ploxel LVS" (mildew-proof agent; active ingredient content: 20%) available from Arch Chemicals Japan, Inc., was added to the reaction solution, followed by stirring the resulting mixture at 70° C. or 1 hour. The obtained mixture was cooled to 25° C. and then subjected to filtration through the above 5 μm filter, and further ion-exchanged water was added to the resulting product to control a solid content thereof to 22.0% by mass, thereby obtaining a water dispersion of the pigment-containing water-insoluble polymer p.

The average particle size of the pigment-containing water-insoluble polymer particles P contained in the resulting water dispersion was 90 nm.

Production Example 3 (Production of Water-Insoluble Polymer Particles Q)

A reaction vessel equipped with a dropping funnel was charged with 0.5 g of methacrylic acid, 14.5 g of methyl methacrylate, 5.0 g of 2-ethylhexyl acrylate, 11.1 g of "LATEMUL E-118B" (sodium polyoxyethylenealkylethersulfate; surfactant) available from Kao Corporation, 0.2 g of potassium persulfate as a polymerization initiator available from Wako Pure Chemical Industries, Ltd., and 282.8 g of ion-exchanged water, followed by mixing the contents of the reaction vessel with each other, and then an inside atmosphere of the reaction vessel was replaced with a nitrogen gas, thereby obtaining an initially charged monomer solution. On the other hand, 9.5 g of methacrylic acid, 275.5 g of methyl methacrylate, 95.0 g of 2-ethylhexyl acrylate, 35.1 g of "LATEMUL E-118B", 0.6 g of potassium persulfate and 183.0 g of ion-exchanged water were mixed with each other to obtain a dropping monomer solution. The resulting dropping monomer solution was charged into the dropping funnel, and an inside atmosphere of the dropping funnel was replaced with a nitrogen gas.

In a nitrogen atmosphere, the initially charged monomer solution in the reaction vessel was heated from room temperature to 80° C. while stirring over 30 minutes, and while maintaining the solution in the reaction vessel at 80° C., the dropping monomer solution in the dropping funnel was gradually added dropwise to the reaction vessel over 3 hours. After completion of the dropwise addition, the obtained mixed solution in the reaction vessel was stirred for 1 hour while maintaining the temperature of the solution in the reaction vessel. Next, the resulting reaction solution was subjected to filtration using a 200 mesh filter, thereby obtaining water-insoluble polymer particles Q (average particle size: 100 nm).

Example 1 (Production of Water-Based Ink)

Using the water dispersion of the carbon black-containing water-insoluble polymer particles obtained in Production Example 2 and the water-insoluble polymer particles Q obtained in Production Example 3, the following composition A was formulated such that the content of the pigment and the water-insoluble polymer particles Q in the ink were 4% by mass and 2.0% by mass, respectively. The resulting mixed solution was subjected to filtration using the aforementioned 5 μm filter, thereby obtaining a water-based ink. The results are shown in Table 2.

[Composition A]

| | |
|---|---|
| Carbon black-containing water dispersion (solid content: 22% by mass) | 26.00 g |
| Water-insoluble polymer particles Q (methyl methacrylate/2-ethylhexyl acrylate/methacrylic acid copolymer (hereinafter referred to as MMA/2-EHA/MAA); solid content: 40.0% by mass; average particle size: 100 nm) | 5.00 g |
| "SURFYNOL 104PG-50" (including acetylene glycol having an average molar number of addition of oxyethylene of 0 (50%) and propylene glycol (50%); active ingredient content: 50%) available from Nissin Chemical Industry Co., Ltd. | 2.0 g |
| Nonionic surfactant (A) | 1.0 g |
| Nonionic surfactant (B) | 2.0 g |
| Polyether-modified silicone (C) | 0.05 g |
| Organic solvent (D): Propylene glycol available from Wako Pure Chemical Industries, Ltd. | 30.00 g |
| Furthermore, ion-exchanged water (as the balance; 34.95 g) was added to adjust a total amount of the obtained solution to 100 g. | |

The details of the nonionic surfactants (A) and (B) as well as the polyether-modified silicone (C) and the organic solvent (D) as shown in Table 2 are as follows.

[Nonionic Surfactant (A)]

S104: "SURFYNOL 104": 2,4,7,9-tetramethyl-5-decyne-4,7-diol

S420: "SURFYNOL 420": ethyleneoxide (20%) adduct of "SURFYNOL 104"; average molar number of addition of ethyleneoxide: 1.3

[Nonionic Surfactant (B)]

S465: "SURFYNOL 465": ethyleneoxide (65%) adduct of "SURFYNOL 104"; average molar number of addition of ethyleneoxide: 10

S485: "SURFYNOL 485": ethyleneoxide (85%) adduct of "SURFYNOL 104"; average molar number of addition of ethyleneoxide: 33

E120: "EMULGEN 120": ethyleneoxide adduct of lauryl alcohol; HLB: 15.3

E147: "EMULGEN 147": ethyleneoxide adduct of lauryl alcohol; HLB: 16.3

E150: "EMULGEN 150": ethyleneoxide adduct of lauryl alcohol; HLB: 18.4

Meanwhile, "SURFYNOL" series are products available from Nissin Chemical Industry Co., Ltd., and Air Products & Chemicals, Inc., and "EMULGEN" series are products available from Kao Corporation.

[Polyether-Modified Silicone (C)]

KF-6204: kinematic viscosity: 70 mm$^2$/s; HLB: 10

KF-351A: kinematic viscosity: 70 mm$^2$/s; HLB: 12

KF-642: kinematic viscosity: 50 mm$^2$/s; HLB: 12

KF-6011: kinematic viscosity: 130 mm$^2$/s; HLB: 12

KF-355A: kinematic viscosity: 150 mm$^2$/s; HLB: 12

SAG005: "SILFACE SAG 005" available from Nissin Chemical Industry Co., Ltd.; kinematic viscosity: 170 mm$^2$/s; HLB: 7

KF-354L: kinematic viscosity: 200 mm$^2$/s; HLB: 16

KF-640: kinematic viscosity: 20 mm$^2$/s; HLB: 12

KF-643: kinematic viscosity: 19 mm$^2$/s; HLB: 14

Meanwhile, "KF" series are polyether-modified silicones available from Shin-Etsu Chemical Industry Co., Ltd.

[Organic Solvent (D)]

PG: Propylene glycol available from Wako Pure Chemical Industries, Ltd.

iPDG: Diethylene glycol monoisopropyl ether available from Nippon Nyukazai Co., Ltd.

1,3PDO: 1,3-Propanediol available from Wako Pure Chemical Industries, Ltd.

EG: Ethylene glycol available from Wako Pure Chemical Industries, Ltd.

BTG: Triethylene glycol monobutyl ether available from Nippon Nyukazai Co., Ltd.

DEG: Diethylene glycol available from Wako Pure Chemical Industries, Ltd.

GLY: Concentrated glycerin for cosmetics available from Kao Corporation

Examples 2 to 6

The same procedure as in Example 1 was repeated except that KF-6204 as the polyether-modified silicone (C) was replaced with KF-351A, KF-642, KF-6011, KF-355A and SAG 005, respectively, thereby obtaining water-based inks.

Example 7

The same procedure as in Example 1 was repeated except that S104 as the nonionic surfactant (A) was replaced with S420, thereby obtaining a water-based ink.

Examples 8 to 11

The same procedure as in Example 1 was repeated except that S465 as the nonionic surfactant (B) was replaced with E120, E147, S485 and E150, respectively, thereby obtaining water-based inks.

Example 12

The same procedure as in Example 1 was repeated except that S465 as the nonionic surfactant (B) was replaced with E147, and 30% by mass of PG as the humectant was replaced with 15% by mass of PG and 15% by mass of iPDG, thereby obtaining a water-based ink.

Example 13

The same procedure as in Example 1 was repeated except that 30% by mass of PG as the humectant was replaced with 30% by mass of iPDG, thereby obtaining a water-based ink.

Examples 14 to 17

The same procedure as in Example 1 was repeated except that the amount of KF-6204 compounded was changed from 0.05% by mass to 0.01% by mass, 0.5% by mass, 1% by mass and 3% by mass, respectively, thereby obtaining water-based inks.

Comparative Examples 1 to 5

The same procedure as in Example 1 was repeated except that as shown in Table 2, the kind of polyether-modified silicone (C) was changed, no polyether-modified silicone (C) was added, or no nonionic surfactant (A) was added, thereby obtaining water-based inks.

Examples 18 to 22 and Comparative Examples 6 to 8

The same procedure as in Example 1 was repeated except that the organic solvent (D) was replaced with those shown in Table 2, thereby obtaining water-based inks.

<Evaluation of Dot Size of Initial Ink Dots, Dot Size of Dried Ink Dots, Uniformity of Printed Characters or Images and Ejection Properties of Ink>

The evaluation results of the water-based inks obtained above are shown in Table 2.

(1) Dot Size of Initial Ink Dots and Dot Size of Dried Ink Dots

Image printing was carried out on a general-purpose glossy paper "OK Topcoat+" (basis weight: 104.7 g/m$^2$; water absorption: 4.9 g/m$^2$) available from Oji Paper Co., Ltd., by the following ink-jet printing method using a water-based ink.

(Ink-Jet Printing Method)

The water-based ink A was loaded to a printing evaluation apparatus available from Trytech Co., Ltd., equipped with an ink-jet print head "KJ4B-HD06MHG-STDV" (piezoelectric type) available from Kyocera Corporation under the environmental conditions of a temperature of 25±1° C. and a relative humidity of 30±5%.

The operating conditions of the apparatus were set to a head voltage of 26 V, a frequency of 20 kHz, an ejected ink droplet amount of 18 pL, a head temperature of 32° C., a resolution of 600 dpi, the number of ink shots for flashing before ejection of 200 shots, and a negative pressure of −4.0 kPa. The recording medium was fixed on a transporting table under reduced pressure such that a length direction of the recording medium was aligned with a transporting direction thereof.

A printing command was transmitted to the printing evaluation apparatus to print images with Duty 0% to Duty 100% on the recording medium. The dot size of ink dots on the printed portion with Duty 30% was measured using a handy-type image quality analysis system "PIAS (registered trademark)-II" available from Quality Engineering Associates (QEA) Inc.

As the dot size of the initial ink dots immediately after being impacted on the recording medium, there was used the dot size as determined at a threshold value set to 70% which was considered to represent a dot size before initiating reduction in size of ink dots owing to drying of the ink. In order to estimate reduction in size of dried ink dots, there was used the dot size as determined at a threshold value set to 40%. The larger the dot size, the more excellent the image quality of solid images printed.

(2) Uniformity of Image Quality

It was recognized that as the ratio of the dot size of the dried ink dots to the dot size of the initial ink dots as measured in the aforementioned item (1) became close to 1.0, the images printed were increased in uniformity thereof. Therefore, the ratio of the dot size of the dried ink dots to the dot size of the initial ink dots [dot size of dried ink dots/dot size of initial ink dots] was used as an index for evaluation of uniformity of the image quality. As the ratio approaches to 1.0, the uniformity of the image quality is more enhanced.

(3) Ejection Properties (Jett-Ability)

After the image printing was carried out using the same ink-jet printer as used in the aforementioned item (1), the ink-jet printer was allowed to stand as such for 30 minutes without protecting the surface of respective nozzles therein, and then print check patterns capable of judging whether or not ink was ejected from all of the nozzles were printed on a paper. The thus obtained print check patterns were observed to count the number of lacks on the patterns (corresponding to the number of nozzles from which no ink was normally ejected; hereinafter also referred to as "missing nozzle") and thereby evaluate ejection properties of the ink according to the following evaluation ratings. The less the number of the nozzles clogged, the more excellent the ejection properties of the ink.

(Evaluation Ratings)

5: No missing nozzles were present;
4: From 1 to 2 missing nozzles were present;
3: From 3 to 5 missing nozzles were present;
2: From 6 to 10 missing nozzles were present; and
1: Not less than 11 missing nozzles were present.

TABLE 2

| | | | Examples | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Pigment | | | 4 | 4 | 4 | 4 | 4 | 4 | 4 | 4 | 4 | 4 | 4 | 4 | 4 | 4 | 4 |
| Insoluble polymer | | | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| Resin emulsion | | | 2 | 2 | 2 | 2 | 2 | 2 | 2 | 2 | 2 | 2 | 2 | 2 | 2 | 2 | 2 |
| | | HLB | | | | | | | | | | | | | | | |
| Surfactant (A) | S104 | 3.0 | 1 | 1 | 1 | 1 | 1 | 1 | | 1 | 1 | 1 | 1 | 1 | 1 | 1 | 1 |
| | S420 | 4.7 | | | | | | | 1 | | | | | | | | |
| Surfactant (B) | S465 | 13.1 | 2 | 2 | 2 | 2 | 2 | 2 | 2 | | | | | | 2 | 2 | 2 |
| | E120 | 15.3 | | | | | | | | 2 | | | | | | | |
| | E147 | 16.3 | | | | | | | | | | 2 | | 2 | | | |
| | S485 | 17.3 | | | | | | | | | | | 2 | | | | |
| | E150 | 18.4 | | | | | | | | | 2 | | | | | | |
| | | KV*1 | | | | | | | | | | | | | | | |
| Polyether-modified silicone (C) | KF6204 | 70 | 0.05 | | | | | | 0.05 | 0.05 | 0.05 | 0.05 | 0.05 | 0.05 | 0.05 | 0.01 | 0.5 |
| | KF351A | 70 | | 0.05 | | | | | | | | | | | | | |
| | KF642 | 50 | | | 0.05 | | | | | | | | | | | | |
| | KF6011 | 130 | | | | 0.05 | | | | | | | | | | | |
| | KF355A | 150 | | | | | 0.05 | | | | | | | | | | |
| | SAG005 | 170 | | | | | | 0.05 | | | | | | | | | |
| | KF354L | 200 | | | | | | | | | | | | | | | |
| | KF640 | 20 | | | | | | | | | | | | | | | |
| | KF643 | 19 | | | | | | | | | | | | | | | |

| | | | Examples | | | | | | | Comparative Examples | | | | | | | |
|---|---|---|---|---|---|---|---|---|---|---|---|---|---|---|---|---|---|
| | | | 16 | 17 | 18 | 19 | 20 | 21 | 22 | 1 | 2 | 3 | 4 | 5 | 6 | 7 | 8 |
| Pigment | | | 4 | 4 | 4 | 4 | 4 | 4 | 4 | 4 | 4 | 4 | 4 | 4 | 4 | 4 | 4 |
| Insoluble polymer | | | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| Resin emulsion | | | 2 | 2 | 2 | 2 | 2 | 2 | 2 | 2 | 2 | 2 | 2 | 2 | 2 | 2 | 2 |
| | | HLB | | | | | | | | | | | | | | | |
| Surfactant (A) | S104 | 3.0 | 1 | 1 | 1 | 1 | 1 | 1 | 1 | 1 | 1 | 1 | 1 | | 1 | 1 | 1 |
| | S420 | 4.7 | | | | | | | | | | | | | | | |
| Surfactant (B) | S465 | 13.1 | 2 | 2 | 2 | 2 | 2 | 2 | 2 | 2 | 2 | 2 | 2 | 3 | 2 | 2 | 2 |
| | E120 | 15.3 | | | | | | | | | | | | | | | |
| | E147 | 16.3 | | | | | | | | | | | | | | | |
| | S485 | 17.3 | | | | | | | | | | | | | | | |
| | E150 | 18.4 | | | | | | | | | | | | | | | |
| | | KV*1 | | | | | | | | | | | | | | | |
| Polyether-modified silicone (C) | KF6204 | 70 | 1 | 3 | 0.05 | 0.05 | 0.05 | 0.05 | 0.05 | | | | | | 0.05 | 0.05 | 0.05 |
| | KF351A | 70 | | | | | | | | | | | | | | | |
| | KF642 | 50 | | | | | | | | | | | | | | | |
| | KF6011 | 130 | | | | | | | | | | | | | | | |
| | KF355A | 150 | | | | | | | | | | | | 0.05 | | | |
| | SAG005 | 170 | | | | | | | | | | | | | | | |
| | KF354L | 200 | | | | | | | | | | 0.05 | | | | | |
| | KF640 | 20 | | | | | | | | | 0.05 | | | | | | |
| | KF643 | 19 | | | | | | | | 0.05 | | | | | | | |

Note
KV*1: Kinematic viscosity

| | | Examples | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Organic solvent | PG | 30 | 30 | 30 | 30 | 30 | 30 | 30 | 30 | 30 | 30 | 30 | 15 | | 30 | 30 |
| | iPDG | | | | | | | | | | | | 15 | 30 | | |

TABLE 2-continued

| (D) | 1,3PDO | | | | | | | | | | | | | | | |
|---|---|---|---|---|---|---|---|---|---|---|---|---|---|---|---|---|
| | EG | | | | | | | | | | | | | | | |
| | BTG | | | | | | | | | | | | | | | |
| | DEG | | | | | | | | | | | | | | | |
| | GLY | | | | | | | | | | | | | | | |
| | Weighted mean value of boiling point | 188 | 188 | 188 | 188 | 188 | 188 | 188 | 188 | 188 | 188 | 188 | 198 | 207 | 188 | 188 |
| Water | | bal.*² | bal.*² | bal.*² | bal.*² | bal.*² | bal.*² | bal.*² | bal.*² | bal.*² | bal.*² | bal.*² | bal.*² | bal.*² | bal.*² | bal.*² |
| Mass ratio [(A) + (B)/(C)] | | 60 | 60 | 60 | 60 | 60 | 60 | 60 | 60 | 60 | 60 | 60 | 60 | 60 | 300 | 6 |
| Dot size of initial ink dots (μm) | | 123 | 122 | 123 | 121 | 123 | 124 | 123 | 123 | 121 | 118 | 116 | 121 | 124 | 132 | 119 |
| Dot size of dried ink dots (μm) | | 123 | 121 | 122 | 120 | 118 | 118 | 123 | 123 | 120 | 117 | 113 | 121 | 121 | 125 | 119 |
| Ratio of Dot size of dried ink dots/ dot size of initial ink dots | | 1.0 | 0.99 | 0.99 | 0.99 | 0.96 | 0.95 | 1.0 | 1.0 | 1.0 | 1.0 | 1.0 | 1.0 | 1.0 | 0.95 | 1.00 |
| Uniformity of images | | 5 | 5 | 5 | 5 | 4 | 4 | 5 | 5 | 5 | 5 | 5 | 5 | 5 | 5 | 5 |
| Ejection properties | | 5 | 5 | 5 | 5 | 5 | 5 | 5 | 5 | 5 | 3 | 3 | 5 | 4 | 4 | 5 |

| | | Examples | | | | | | | Comparative Examples |
|---|---|---|---|---|---|---|---|---|---|
| | | 16 | 17 | 18 | 19 | 20 | 21 | 22 | 1 |
| Organic solvent (D) | PG | 30 | 30 | 15 | | | 18 | | 30 |
| | iPDG | | | | | | | | |
| | 1,3PDO | | | 15 | 30 | | | | |
| | EG | | | | | 30 | | 9 | |
| | BTG | | | | | | 12 | | |
| | DEG | | | | | | | 21 | |
| | GLY | | | | | | | | |
| | Weighted mean value of boiling point | 188 | 188 | 199 | 210 | 197 | 223 | 230 | 198 |
| Water | | bal.*² | bal.*² | bal.*² | bal.*² | bal.*² | bal.*² | bal.*² | bal.*² |
| Mass ratio [(A) + (B)/(C)] | | 3 | 1 | 60 | 60 | 60 | 60 | 60 | 60 |
| Dot size of initial ink dots (μm) | | 112 | 108 | 123 | 124 | 121 | 129 | 121 | 127 |
| Dot size of dried ink dots (μm) | | 112 | 108 | 122 | 121 | 120 | 125 | 117 | 120 |
| Ratio of Dot size of dried ink dots/ dot size of initial ink dots | | 1.00 | 1.00 | 0.99 | 0.98 | 0.99 | 0.97 | 0.97 | 0.94 |
| Uniformity of images | | 5 | 5 | 5 | 5 | 5 | 5 | 5 | 3 |
| Ejection properties | | 5 | 5 | 4 | 4 | 5 | 4 | 4 | 3 |

| | | Comparative Examples | | | | | | |
|---|---|---|---|---|---|---|---|---|
| | | 2 | 3 | 4 | 5 | 6 | 7 | 8 |
| Organic solvent (D) | PG | 30 | 30 | 30 | 30 | 12 | | |
| | iPDG | | | | | | | |
| | 1,3PDO | | | | | | | |
| | EG | | | | | | 18 | |
| | BTG | | | | | 18 | | 30 |
| | DEG | | | | | | | |
| | GLY | | | | | 12 | | |
| | Weighted mean value of boiling point | 198 | 198 | 198 | 198 | 241 | 234 | 276 |
| Water | | bal.*² | bal.*² | bal.*² | bal.*² | bal.*² | bal.*² | bal.*² |
| Mass ratio [(A) + (B)/(C)] | | 60 | 60 | | 60 | 60 | 60 | 60 |
| Dot size of initial ink dots (μm) | | 128 | 131 | 135 | 110 | 132 | 122 | 133 |
| Dot size of dried ink dots (μm) | | 119 | 118 | 117 | 104 | 123 | 117 | 119 |

| | | | | | | | |
|---|---|---|---|---|---|---|---|
| Ratio of Dot size of dried ink dots/ dot size of initial ink dots | 0.93 | 0.90 | 0.87 | 0.95 | 0.93 | 0.96 | 0.89 |
| Uniformity of images | 3 | 3 | 2 | 4 | 3 | 4 | 2 |
| Ejection properties | 2 | 2 | 2 | 4 | 3 | 4 | 2 |

Note
bal.*[2]: Balance

From Table 2, it was confirmed that the inks obtained in Examples 1 to 17 were excellent in ejection properties, could be prevented from suffering from reduction in a dot size of the ink during a drying step thereof even when printed on a recording medium, in particular, a low-water absorbing recording medium (coated paper), and were capable of obtaining printed characters or images having excellent uniformity, as compared to the inks obtained in Comparative Examples 1 to 5.

INDUSTRIAL APPLICABILITY

In accordance with the present invention, there are provided a water-based ink that is excellent in ejection properties, can be prevented from suffering from reduction in a dot size of the ink during a drying step thereof even when printed on a recording medium, in particular, a low-water absorbing recording medium, and is capable of obtaining printed characters or images having excellent uniformity, as well as an ink-jet printing method using the water-based ink.

The invention claimed is:

1. A water-based ink comprising:
a pigment,
a water-insoluble polymer,
an acetylene glycol-based nonionic surfactant (A) having a Hydrophile-Lipophile Balance (HLB) of not less than 0 and not more than 5,
a nonionic surfactant (B) having HLB of not less than 6 and not more than 20,
a polyether-modified silicone (C) having a kinematic viscosity of not less than 30 mm$^2$/s and not more than 190 mm$^2$/s as measured at 25° C., and
an organic solvent (D),
in which a weighted mean value of a boiling point of the organic solvent (D) is not lower than 150° C. and not higher than 230° C., wherein the content of component (B) is 0.5% by mass or more.

2. The water-based ink according to claim 1, wherein the pigment and the water-insoluble polymer are present in the form of pigment-containing water-insoluble polymer particles.

3. The water-based ink according to claim 1, wherein the acetylene glycol-based nonionic surfactant (A) is acetylene glycol or an ethyleneoxide adduct of the acetylene glycol having an average molar number of addition of ethyleneoxide of not less than 0 and not more than 3.0.

4. The water-based ink according to claim 1, wherein the nonionic surfactant (B) is at least one compound selected from the group consisting of an ethyleneoxide adduct of acetylene glycol having an average molar number of addition of ethyleneoxide of not less than 5.0 and not more than 40.0 and an alkyleneoxide adduct of an alcohol having not less than 6 and not more than 30 carbon atoms.

5. The water-based ink according to claim 1, wherein the water-based ink comprises propylene glycol as the organic solvent (D) in an amount of not less than 10% by mass.

6. The water-based ink according to claim 1, wherein a content of the polyether-modified silicone (C) in the water-based ink is not less than 0.01% by mass and not more than 5% by mass.

7. The water-based ink according to claim 1, wherein a mass ratio of a sum of the acetylene glycol-based nonionic surfactant (A) and the nonionic surfactant (B) to the polyether-modified silicone (C), the mass ratio having the formula [(A)+(B)/(C)], is not less than 0.5 and not more than 400.

8. The water-based ink according to claim 1, wherein a mass ratio of a sum of the acetylene glycol-based nonionic surfactant (A) and the nonionic surfactant (B) to the polyether-modified silicone (C), the mass ratio having the formula [(A)+(B)/(C)], is not less than 2.5 and not more than 400.

9. The water-based ink according to claim 1, further comprising water-insoluble polymer particles.

10. The water-based ink according to claim 1, wherein a content of the acetylene glycol-based nonionic surfactant (A) in the water-based ink is not less than 0.4% by mass and not more than 4.0% by mass.

11. The water-based ink according to claim 1, wherein a content of the nonionic surfactant (B) in the water-based ink is not less than 0.5% by mass and not more than 9.0% by mass.

12. The water-based ink according to claim 1, wherein a content of water in the water-based ink is not less than 20% by mass and not more than 75% by mass.

13. The water-based ink according to claim 1, wherein the acetylene glycol-based nonionic surfactant (A) is at least one compound selected from the group consisting of one or more acetylene glycols selected from the group consisting of 2,4,7,9-tetramethyl-5-decyne-4,7-diol, 3,6-dimethyl-4-octyne-3,6-diol and 2,5-dimethyl-3-hexyne-2,5-diol, and ethyleneoxide adducts of these acetylene glycols.

14. The water-based ink according to claim 1, wherein the nonionic surfactant (B) is at least one compound selected from the group consisting of an ethyleneoxide adduct of acetylene glycol, an alkyleneoxide adduct of an alcohol and a fatty acid alkanol amide.

15. The water-based ink according to claim 1, wherein the nonionic surfactant (B) is an alkyleneoxide adduct of an alcohol having not less than 6 and not more than 30 carbon atoms.

16. The water-based ink according to claim 1, wherein a total content of the acetylene glycol-based nonionic surfactant (A) and the nonionic surfactant (B) in the water-based ink is not less than 1.5% by mass and not more than 9.0% by mass.

17. The water-based ink according to claim 1, wherein a mass ratio of the acetylene glycol-based nonionic surfactant (A) to the nonionic surfactant (B) the mass ratio having the formula [surfactant (A)/surfactant (B)], is not less than 0.1 and not more than 3.0.

18. The water-based ink according to claim 1, wherein the organic solvent (D) contains at least one compound selected from the group consisting of ethylene glycol, propylene glycol and diethylene glycol monoisopropyl ether.

19. An ink-jet printing method comprising the step of printing characters or images on a recording medium using the water-based ink according to claim 1, in which the recording medium has a water absorption of not less than 0 g/m² and not more than 10 g/m² as measured in a pure water contact time of 100 milliseconds.

* * * * *